US006983277B2

(12) United States Patent
Yamaguchi et al.

(10) Patent No.: US 6,983,277 B2
(45) Date of Patent: Jan. 3, 2006

(54) METHOD AND SYSTEM OF DATABASE MANAGEMENT FOR REPLICA DATABASE

(75) Inventors: Kota Yamaguchi, Yamato (JP); Shigetoshi Hayashi, Fujisawa (JP); Junko Katsumata, Yokohama (JP); Taichi Ishikawa, Yokohama (JP); Hiroshi Yamakawa, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 493 days.

(21) Appl. No.: 10/184,246

(22) Filed: Jun. 26, 2002

(65) Prior Publication Data

US 2002/0198899 A1    Dec. 26, 2002

(30) Foreign Application Priority Data

Jun. 26, 2001    (JP)    ............................. 2001-192171

(51) Int. Cl.
 *G06F 17/30*    (2006.01)
(52) U.S. Cl. ........................... 707/8; 707/10; 707/201; 709/141
(58) Field of Classification Search .................... 707/8, 707/10, 201; 711/141
See application file for complete search history.

(56) References Cited

U.S. PATENT DOCUMENTS

| 4,853,843 | A | * | 8/1989 | Ecklund ........................ 707/203 |
| 5,251,318 | A | * | 10/1993 | Nitta et al. ................... 711/152 |
| 5,987,497 | A | * | 11/1999 | Allgeier ........................ 709/201 |
| 6,253,295 | B1 | * | 6/2001 | Beal et al. ..................... 711/162 |
| 6,393,434 | B1 | * | 5/2002 | Huang et al. .................. 707/200 |
| 6,549,907 | B1 | * | 4/2003 | Fayyad et al. ................. 707/101 |
| 6,711,575 | B1 | * | 3/2004 | Applewhite et al. ......... 707/100 |

FOREIGN PATENT DOCUMENTS

| JP | 08-185346 | 7/1996 |
| JP | 2000-112801 | 4/2000 |
| JP | 2000-347811 | 12/2000 |

OTHER PUBLICATIONS

"Use in Conjunction with a Storage Area Network Further Increases the Operability of Microsoft SQL Server 2000," Nikkei Open Systems 99:266-267 (2001).

* cited by examiner

*Primary Examiner*—Jack M. Choules
(74) *Attorney, Agent, or Firm*—Townsend and Townsend and Crew LLP

(57) ABSTRACT

When a database area multi-written or replicated in an external storage unit is separated, a database management system writes consistent data into the external storage unit. A method and system capable of controlling a timing of separating the replicated database area is provided. Furthermore, new data directory information necessary to access the replicated database is dynamically added based on the data directory information of the replication source database. A method and system capable of selecting whether to access the database which is the source of the replication or access the replicated database are provided. Thus, when the database area multi-written or replicated in an external storage unit is separated and physical replicated databases are created, it is possible to maintain consistency of the replicated databases while continuing transaction processing.

7 Claims, 23 Drawing Sheets

FIG. 9

| DATA CACHE STATUS | | | a | b | c | d | e | f |
|---|---|---|---|---|---|---|---|---|
| TRANSACTION TYPE | UPDATE | TRANSACTION IN PROGRESS | PERMITTED | PERMITTED | PERMITTED | ONLY PERMITTED IN DATA CACHE | PERMITTED | PERMITTED |
| | | NEW TRANSACTION | PERMITTED | PROHIBITED | PENDING | ONLY PERMITTED IN DATA CACHE | PROHIBITED | PENDING |
| | REFERENCE | TRANSACTION IN PROGRESS | PERMITTED | PERMITTED | PERMITTED | PERMITTED | PERMITTED | PERMITTED |
| | | NEW TRANSACTION | PERMITTED | PERMITTED | PERMITTED | PERMITTED | PROHIBITED | PENDING |

FIG. 11

DATA FORMAT EXAMPLE OF TABLE/INDEX STORAGE AREA INFORMATION MANAGEMENT TABLE
1101

| TABLE/INDEX NAME | AREA NAME |
|---|---|
| Table1 | a |
| Idx1 | a |

1102: TABLE/INDEX NAME
1103: AREA NAME

DATA FORMAT EXAMPLE OF DATA DIRECTORY INFORMATION MANAGEMENT TABLE
1105          1106

| 1104 | AREA PHYSICAL INFORMATION SECTION | | | | | | ACCESS PATH INFORMATION SECTION | | | | |
|---|---|---|---|---|---|---|---|---|---|---|---|
| AREA NAME | DATABASE SYSTEM NAME | PAGE LENGTH | NUMBER OF PAGES | SPACE ALLOCATION UNIT | NUMBER OF TABLES | NUMBER OF INDICES | COPY SOURCE AREA NAME | NUMBER OF COPIES | GENERATION IDENTIFIER | STATUS | STORAGE ACCESS PATH NAME |
| a | | | | | | | a | 2 | 0 | CURRENT | |
| b | | | | | | | a | — | 1 | SUB | |
| c | | | | | | | a | — | 2 | SUB | |

1301 DATA FORMAT EXAMPLE OF PROGRAM EXECUTION MANAGEMENT TABLE

| PROGRAM NAME | PROCESS NUMBER | PHYSICAL AREA ACCESS OPTION INFORMATION 1302 | | |
|---|---|---|---|---|
| | | DIRECT AREA SPECIFICATION FLAG | GENERATION ACCESS SPECIFICATION FLAG | GENERATION IDENTIFIER |
| | | | | |
| | | | | |
| | | | | |

1303

METHOD AND SYSTEM OF DATABASE MANAGEMENT FOR REPLICA DATABASE

BACKGROUND OF THE INVENTION

The present invention relates to an on-line database management system for managing large-volume database transactions, and more particularly, to a database management technology for processing applications storing databases in a storage unit under the control of a SAN (Storage Area Network) and providing continuous around-the-clock services.

An on-line processing application handling large-volume transactions requires daily, weekly, monthly processing such as counting of large-volume data and batch registration, or periodical batch processing such as database backup and reorganization. Since these types of processing involve batch access to databases used for on-line services, these types of processing have great influences on processing of on-line processing applications, constituting an obstacle to around-the-clock service operations.

As a solution to this problem, a method of providing a plurality of database management systems on a LAN/WAN, transmitting updated contents of a database used for an on-line processing application to another database management system over a network at the appropriate times, reflecting them and replicating the on-line processing application database is known as described in JP-A-8-185346 and JP-A-2000-112801. By realizing the above-described batch processing with the database on the replicating side, it is possible to avoid concentration of load on the on-line processing application side and continue on-line services in parallel with batch processing.

A SAN (Storage Area Network) configuration, which organically connects a plurality of storage units such as magnetic disk units over a dedicated high-speed network, is becoming widespread in recent years. In this configuration, the storage units provide a function of speedily copying an arbitrary logical volume to a plurality of logical volumes, a function of multiple data writing using an arbitrary logical volume as a primary volume and a plurality of other logical volumes as secondary volumes, a function of separating logical volumes in a multiple write status at arbitrary timing and accessing them as primary and secondary volumes independent of one another, a difference reflection function of restarting multiple write using an arbitrary logical volume as a primary volume and a plurality of other logical volumes as secondary volumes and reflecting only differences between both data from the primary volume to the secondary volumes, etc. Furthermore, a plurality of CPUs connected on the SAN can perform input/output to/from an arbitrary storage product within the network as in the case where the CPUs and the storage product are directly connected.

Here, the "multiple data writing" means a process in which when an operation (insertion, update or deletion) is performed for certain data in a master database (i.e., a source database which creates a replicated database (or replica database)), the same operation is performed for data, which corresponds to the certain data, in the replicated database.

An application example of database access in this connection mode is a backup method described in JP-A-2000-347811. This system makes it possible to speedily copy a logical volume storing a database on the on-line processing application side to another logical volume and replicate the database, which in turn can be used as a backup in preparation for database trouble with the on-line processing application database.

On the other hand, the replicated databases created in this way are physical copies and accessing them as databases requires information for the database management system side to have access to the replicated databases. Therefore, this problem is handled by starting database management systems having the same database definition information as that on the on-line processing application side for their respective replicated databases separately (NIKKEI OPEN SYSTEMS, June 2001 (no.99) pp.266–267).

SUMMARY OF THE INVENTION

However, no conventional technologies describe how to solve the problem involved in physically copying logical volumes which store databases, using the replicated databases created and simultaneously executing batch processing applications independently of on-line processing applications. This prevents the full exploitation of the additional functions such as a high-speed copy function on the storage unit side especially in a SAN environment.

That is, logical volumes should be made replicable while maintaining consistency of database updates carried out in transaction units. This requires transaction control over the database management system and replica creation timing synchronized with data cache control by the main storage unit. Furthermore, the replicated databases on the logical volume should be made selectable by and accessible to both the replication source database management system and other database management systems arbitrarily. Furthermore, a database group accessed in batch processing does not always match a replicated database group replicated in logical volume units. For this reason, an arbitrary replicated database group should be made uniquely selectable as a database group to be accessed in batch processing.

The data processing unit according to the present invention is provided with: a first data synchronizing unit for writing unwritten data in a data cache area in a main storage unit and updated data by all transactions in progress in a corresponding external storage unit at once, and for delaying the write to the external storage by temporarily prohibiting or putting off an update by a newly generated transaction, or by carrying out the update only on the data cache; and a first data synchronization canceling unit for restarting an update of the data under the control of the first synchronizing unit. This allows a series of operations such as setting a logical volume, which stores a database, in a multiple write status to execute an on-line processing application, operating the data synchronizing unit 1 for the database at any given time, and upon completion of this operation, immediately instructing the storage unit to cancel the multiple write status of the logical volume to separate the logical volume, and operating the first data synchronization canceling unit immediately upon completion of the separation. This allows the separated logical volume to become a consistent database when the first data synchronizing unit is operated. In general, the logical volume separation operation is completed in a short time by only changing the status in the storage unit, and therefore the prohibition of data updates by transactions generated after the start of the first data synchronizing unit until the start of the first data synchronization canceling unit or waiting time also lasts for a short time causing little influence on the on-line processing application. Furthermore, when a data update is performed only on the data cache and the write in the external storage is delayed, if there is a sufficient capacity in the cache area, the data update from the on-line processing application can be continued. The handling of these newly generated transactions corresponds to selectable options of the first data synchronizing unit and is selectable according to the situation of the on-line processing application.

Next, the data processing unit according to the present invention is provided with: a second data synchronizing unit for erasing all data in the data cache area in the main storage unit when all transactions in progress are completed and temporarily prohibiting or putting off access by a transaction newly generated in the meantime; and a second data synchronization canceling unit for restarting data access under the control of the second synchronizing unit. That is, this allows a series of operation such as operating the second data synchronizing unit for the corresponding database on the on-line processing application side which is the database replication source upon completion of a data update by batch processing, and upon completion of this operation, immediately instructing the storage unit to set a multiple write status using the database storage logical volume on the batch processing side in a primary status and the database storage logical volume on the on-line processing application side in a secondary status to make both logical volumes multiple access state, and operating the data synchronization canceling unit 2 immediately after completion of this operation. This makes it possible to reflect a consistent database updated by batch processing on the on-line processing application side, and since the database access cache on the on-line processing application side is erased temporarily, it is possible to maintain consistency with the database entity. Furthermore, a multiple write instruction for independent logical volumes only applies to a status change in the storage unit and is generally completed in a short time. The reflection of difference data from the primary volume to the secondary volumes is performed asynchronously in the storage unit while continuing the on-line processing application. Therefore, the prohibition of database access or waiting status of a transaction generated after the start of the second data synchronizing unit until the start of the second data synchronization canceling unit also lasts for a short time causing little influence on the on-line processing application.

Furthermore, the data processing unit according to the present invention is provided with: a data directory information dynamic copying unit capable of copying, based on first data directory information registered in a database management system to access the storage area in which a database is stored, a common information section independent of the access path of the storage area such as the name of the relevant database and structural information, rewriting only information of the access path to the storage area to information of access to another arbitrary storage area, and dynamically adding second data directory information with a new name storing the name of the first data directory information of the copy source; a data directory information dynamic registering unit capable of registering the newly created second data directory information in the own database management system or another database management system; and an access target allocating unit for changing, when the name of the first data directory information is stored in the second data directory information, a database access request from the application program to be executed according to the first data directory information in such a way as to be executed according to the second data directory information. This allows databases on the replicated logical volumes to be arbitrarily selectable by and accessible to the replication source database management system as well as another database management system.

Furthermore, the data processing unit according to the present invention is provided with: a data directory information dynamic copying unit capable of adding an arbitrary generation identifier to newly added second data directory information; an access target allocating unit for selecting one or more data directory information groups by the generation identifier or the name of the newly added second data directory information to allocate the access target databases; an access target setting unit capable of specifying the generation identifier or the name of the newly added data directory information in units of clients accessing the database; and a current access generation setting unit for determining all access requests from a client, for which the generation identifier or the name of the newly added data directory information is not set, as access requests for which a specific generation identifier is uniformly specified. This allows an arbitrary replicated database group to be uniquely selectable as a database group to be accessed by batch processing.

Other objects, features and advantages of the invention will become apparent from the following description of the embodiments of the invention taken in conjunction with the accompanying drawings.

BRIEF DESCRIPTION OF THE DRAWINGS

FIG. 9 is a status matrix concerning an input/output operation for an external storage unit through a data cache area of the present invention;

FIG. 11 is a definition format example of table/index storage area management information of a replicated database;

FIG. 13 is a data format example of an execution management table of a program for accessing a replicated database;

DESCRIPTION OF THE EMBODIMENTS

With reference now to the attached drawings, embodiments of the present invention will be explained below.

Figure 1:
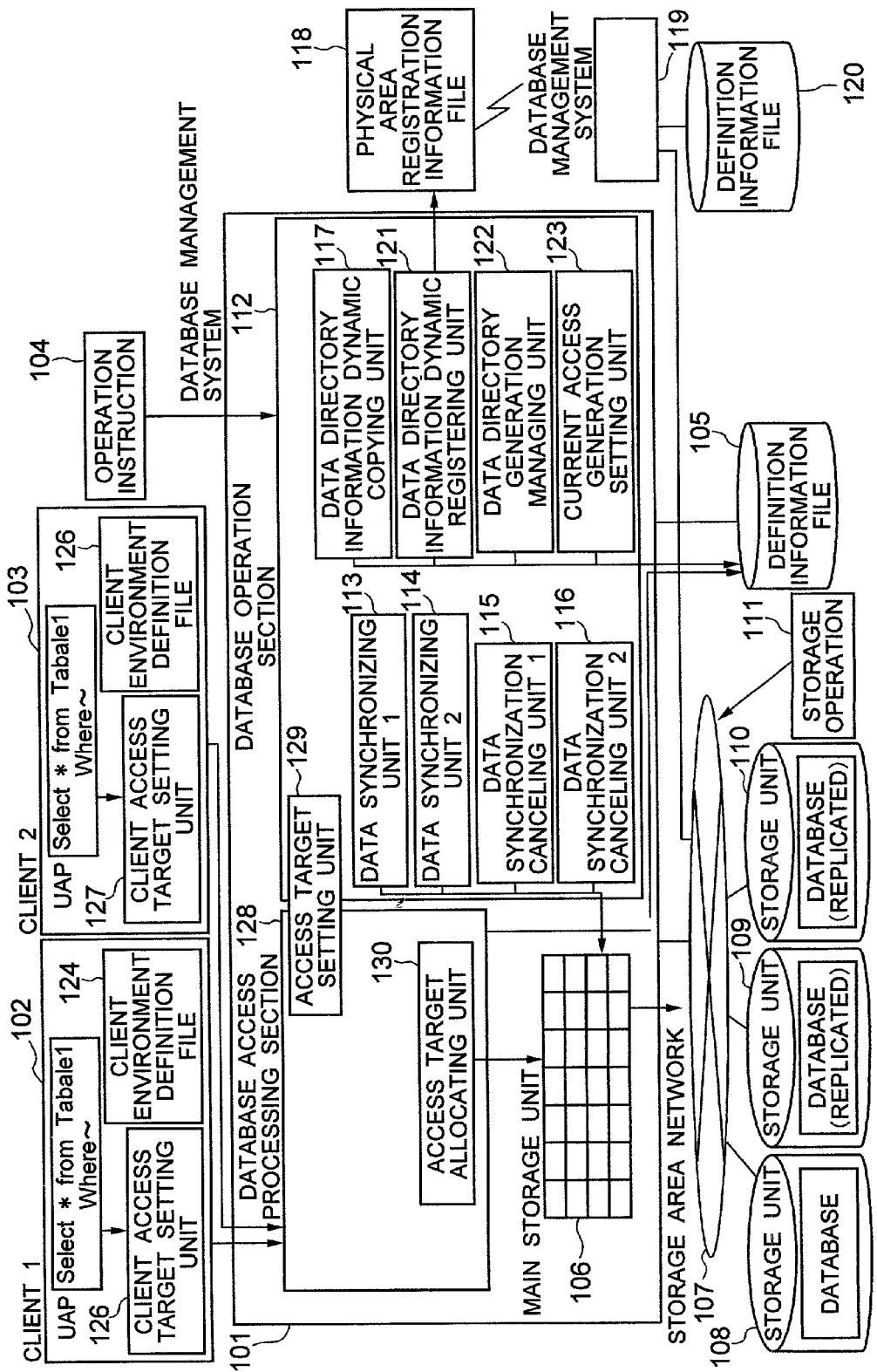
FIG. 1 is an embodiment in a functional configuration of a data processing unit according to the present invention.

First, an outline of the present invention will be explained by using FIG. 1. FIG. 1 is an embodiment in a functional configuration of a data processing unit according to the present invention. A database management system 101 accepts requests from clients 102 and 103, which issue database access requests, or instructions 104 for various operations by an administrator, acquires table/index area information to be accessed from a definition information file 105 on an external storage unit which stores table/index information defined in a database, and accesses the database constructed on a SAN (Storage Area Network) 107 through a main storage unit 106. A database 108 is multiplexed and controlled by a storage unit. The database 108 can be separated into replicated databases 109 and 110 or differences of the database 108 can be reflected in those databases, by a storage operation 111.

A database operation section 112 of the database management system 101 includes: a data synchronizing unit 1 (113) that in response to the storage operation 111, writes unwritten data and updated data of all transactions in progress in the data cache area in the main storage unit 106 to the external storage unit 107 at once, and temporarily prohibits or puts off an update by a newly generated transaction or performs the update only on the data cache in the main storage unit 106, and delays the write to the external storage; a data synchronization canceling unit 1 that restarts the data update under the control of the synchronizing unit 1; a data synchronizing unit 2 (114) that erases all data in the data cache in the main storage unit 106 upon completion of all transactions in progress, temporarily prohibits or puts off access from a new transaction generated in the meantime; a data desynchronizing unit 1 (115) that restarts the data update under the control of the synchronizing unit 1; a data desynchronizing unit 2 (116) that restarts data access under the control of the synchronizing unit 2; a data directory information dynamic copying unit 117 that creates new data directory information to access the replicated database from the data directory information of the replication source database; a data directory information dynamic registering unit 121 that registers the created data directory information in the data directory information file 109 which is the own database, or a definition information file 120 of another database management system 119 through the data directory registration information file 118, under a new data directory information name; a data directory generation managing unit 122 capable of adding a generation identifier to the newly added data directory information to allow an arbitrary selection of a replicated database from the clients 102 and 103 or administrator 104; and a current access generation setting unit 123 that determines all access requests from the clients for which no generation identifier or no newly added data directory information name is specified, as requests with specific generation identifier uniformly specified.

Furthermore, the clients 102 and 103 include client access target setting units 126 and 127 that notify the contents of the client environment definition files 124 and 125, which describe generation identifiers of the databases to be accessed, to the database management system. The database access processing section 128 of the database management system 101 includes: an access target setting unit 129 that sets any one of the multiplexed databases as the access target for each accepted program; and an access target allocating unit 130 that allocates access targets of the storage unit according to the information set by the access target setting unit 129 at the time of data access.

Then, a first embodiment will be explained below.

Figure 2:
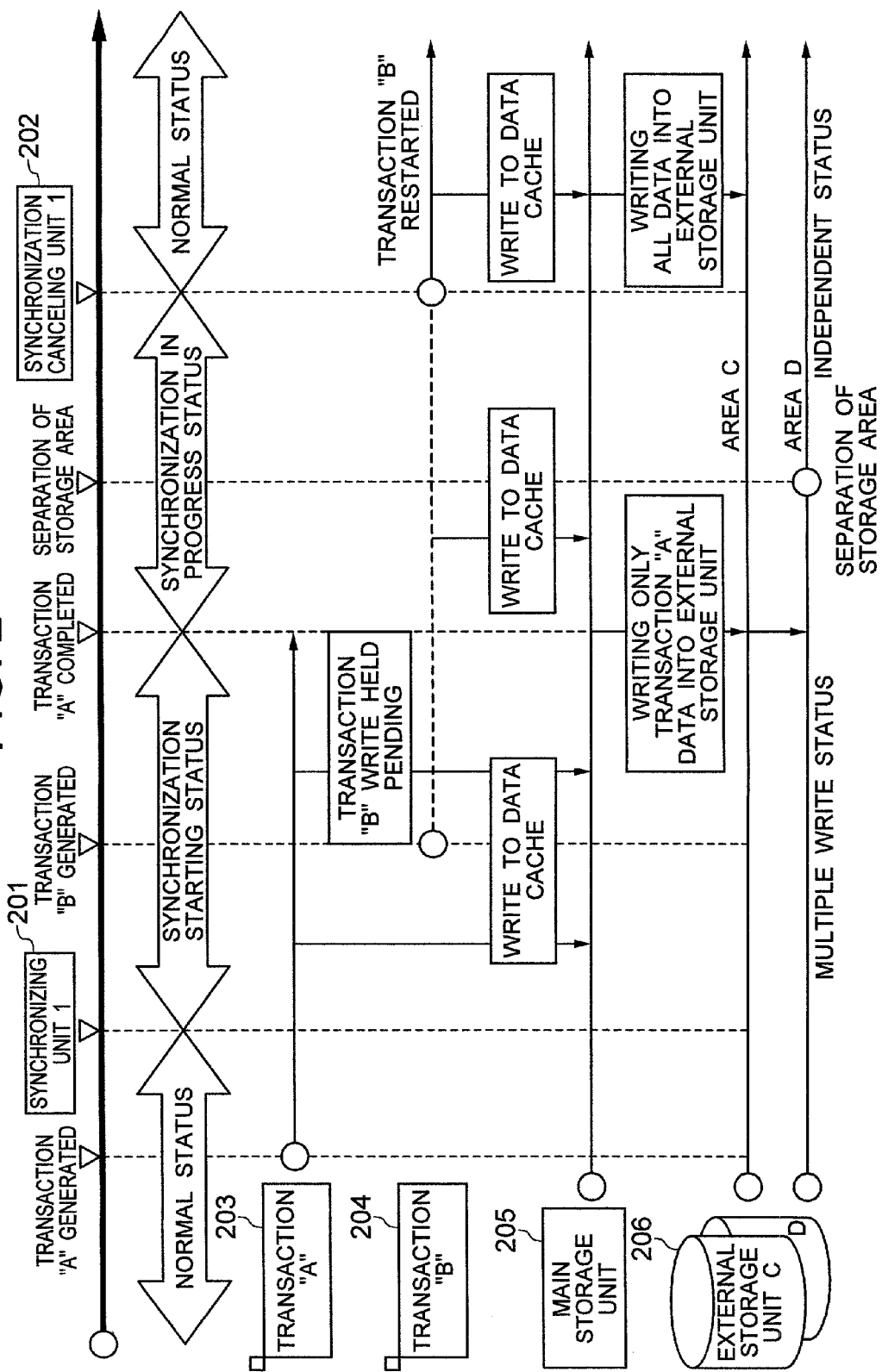
FIG. 2 is a time chart illustrating a data synchronizing unit and a data synchronization canceling unit of the present invention.

FIG. 2 is a time chart illustrating the data synchronizing unit and data synchronization canceling unit of the present invention. This time chart shows changes over time in operations of the data synchronizing unit 1 (201) and the data synchronization canceling unit 1 (202) in the database system shown in FIG. 1 when handling transactions A (203) and B (204). When a request from the data synchronizing unit 1 (201) arrives at the database system at a certain time, the data synchronizing unit 1 (201) is executed on a data cache in the main storage unit (205), and the specific data cache in the main storage unit (205) enters a synchronization starting status from then on. The transaction A (203) which occurred before the synchronization starting status can write update information to the main storage unit (205) arbitrarily even after the database synchronization starting status and can further write data to the external storage unit (206). Since the data cache is in the synchronization starting status, the action on the data cache of the transaction B (204) which occurs after the synchronization starting status is determined according to the authority to write data to the data cache shown in FIG. 9, and a write to the external storage unit (206) is prohibited. After completion of the transaction A (203), the updated data in the main storage by the transaction A (203) and unwritten data remaining in the data cache are forcibly written into the external storage unit (206), the data cache changes from the synchronization starting status to a synchronization in progress status, and the processing of the data synchronizing unit 1 (201) is completed. FIG. 9 also shows an action of the transaction B (204) in the synchronization in progress status on the data cache. Then, the external storage units C and D (206) having a multiple write mechanism shown in FIG. 8 are separated together with the multiple write cancellation mechanism shown in FIG. 8 by a storage area separation request, and the external storage unit D is immediately allowed to be used as a replica consistent with the external storage unit C. After completion of the storage area separation request, the synchronization in progress status of the data cache is canceled by a data synchronization cancellation request (202). After the cancellation of the synchronization in progress status, the transaction B (204) restarts access to the data cache and is allowed to write data into the main storage area and arbitrarily write data into the external storage unit C.

Figure 3:
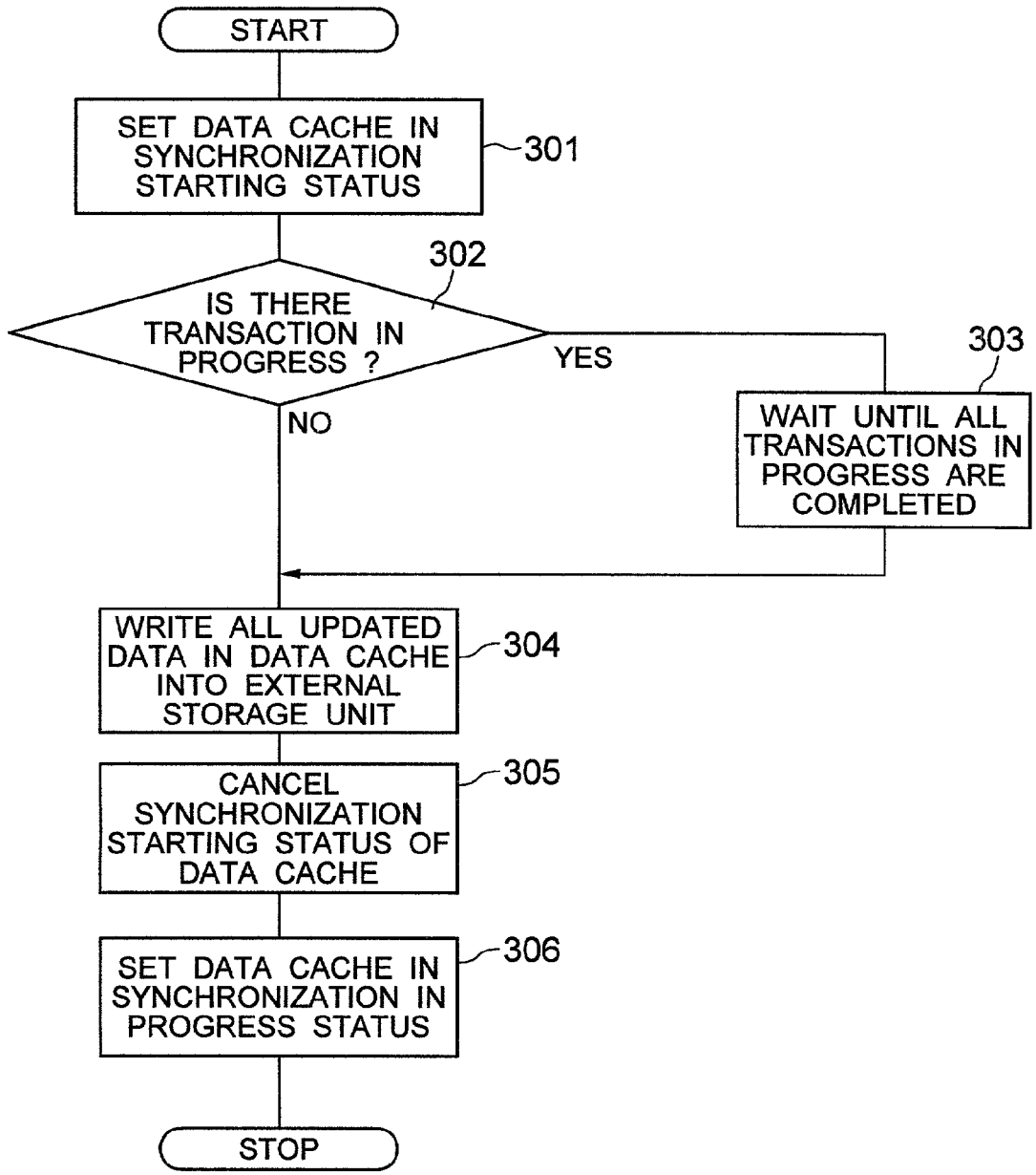
FIG. 3 is a flow chart of the data synchronizing unit of the present invention.

FIG. 3 is a flow chart of the data synchronizing unit of the present invention. In step 301, the data cache in the main storage is set in a synchronization starting status. In step 302, it is decided whether or not there is any transaction in progress. If there is some transaction in progress, the system waits until all transactions in progress are completed, in step 303. If there is no transaction in progress, all updated data in the data cache is written into the external storage unit in step 304. In step 305, the synchronization starting status of the data cache is canceled. In step 306, the data cache is changed to a synchronization in progress status to finish the processing of the data synchronizing unit 1.

Figure 4:
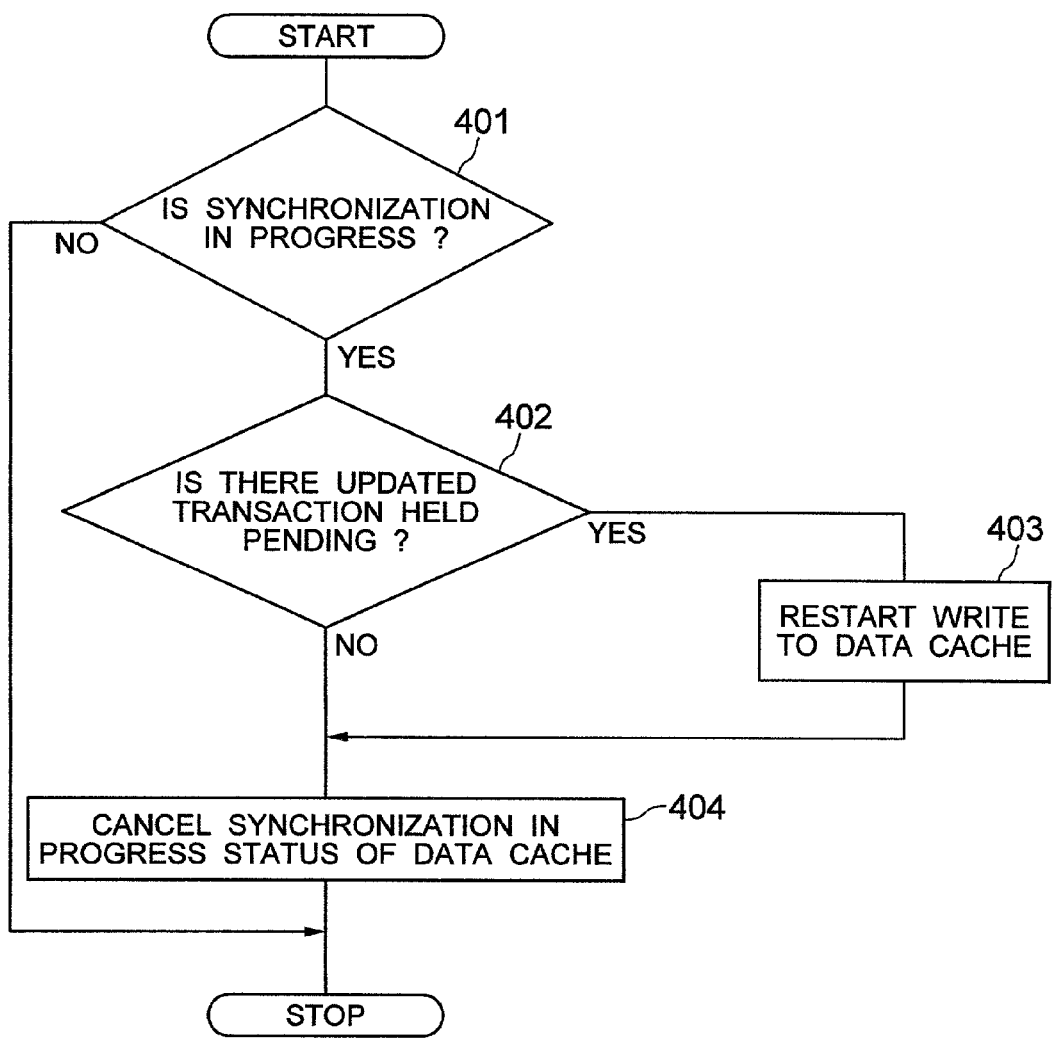
FIG. 4 is a flow chart of the data synchronization canceling unit of the present invention.

FIG. 4 is a flow chart of the data synchronization canceling unit of the present invention. In step 401, it is decided whether or not the system is in a synchronization in progress status. If it is not in the synchronization in progress status, the processing of the data synchronization canceling unit 1 is completed. If it is in the synchronization in progress status, it is decided in step 402 whether or not there is any pending transaction in progress. If there is some transaction in progress, a write of the updated data in the data cache is restarted in step 403. If there is no transaction in progress, the system moves on to the next processing. In step 404, the synchronization in progress status of the data cache is canceled and the processing of the data synchronization canceling unit 1 is completed.

Figure 5:
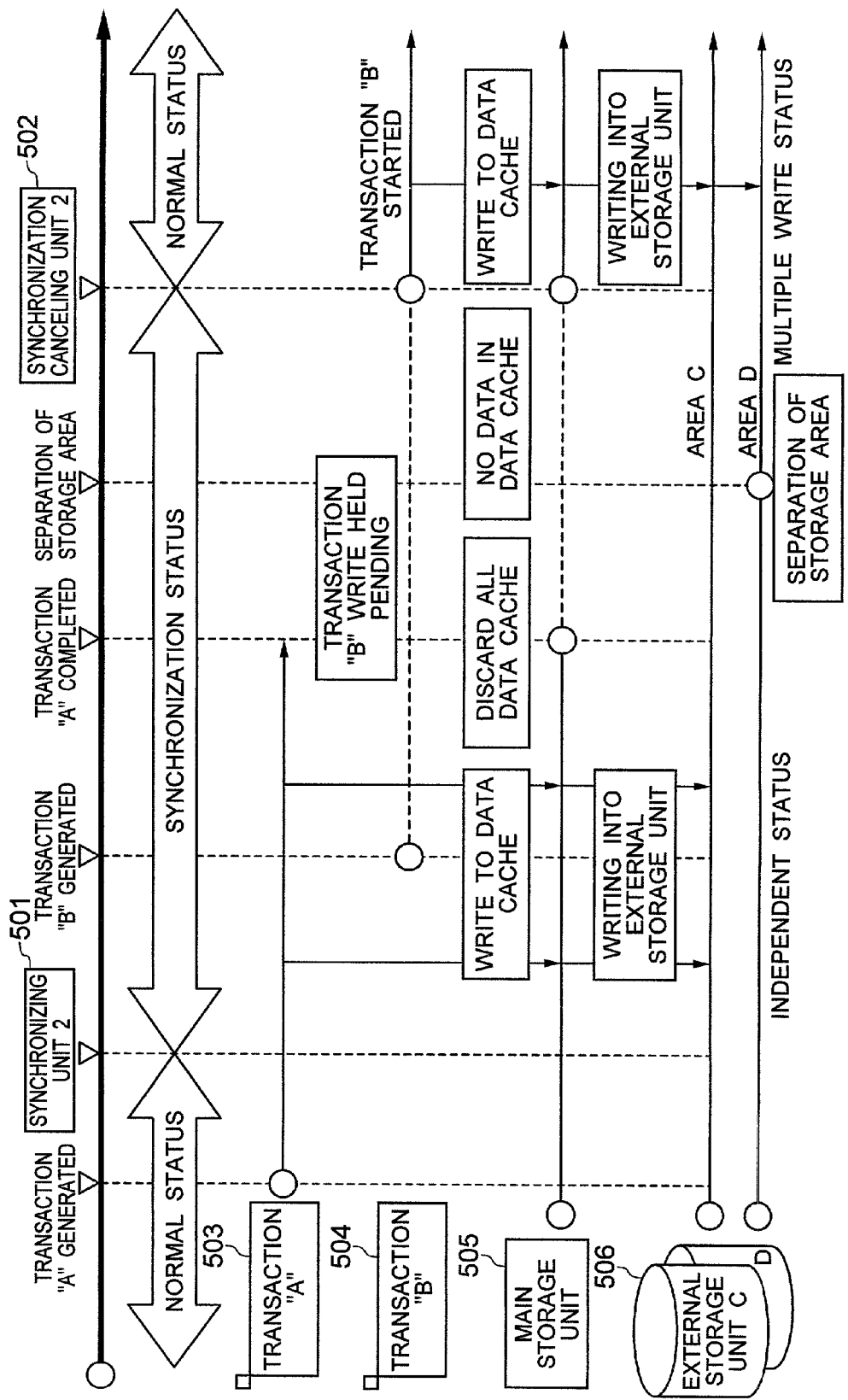
FIG. 5 is a time chart illustrating the data synchronizing unit and data synchronization canceling unit of the present invention.

FIG. 5 is a time chart illustrating the data synchronizing unit and data synchronization canceling unit of the present invention. This time chart shows changes over time in operations of the data synchronizing unit 2 (501) and data synchronization canceling unit (502) in the database system shown in FIG. 1 when handling the transactions A (503) and B (504). When a request from the data synchronizing unit 2 (501) arrives at the database system at a certain time, the data synchronizing unit 2 (501) is executed on a specific data cache in the main storage unit (505), and the data cache in the main storage unit (505) enters into a synchronization status from then on. The transaction A (503) which occurs before the synchronization status can write update information into the data cache in the main storage unit (505) arbitrarily even after the database synchronization status, and can further write data into the external storage unit (506). Since the data cache is in the synchronization status, the action on the data cache of the transaction B (504) which occurs after the synchronization status is determined according to the authority to write data into the data cache shown in FIG. 9 and even access to the data cache is prohibited. After completion of the transaction A (503), all data in the data cache in the main storage is erased and the processing of the data synchronizing unit 2 (501) is completed. The action on the data cache of the transaction B (504) in the synchronization status after the completion of the transaction A (503) remains unchanged from before the completion. Then, the external storage units C and D (506) having a multiple write mechanism shown in FIG. 8 are returned to the multiple write status shown in FIG. 8 by a multiple write status restarting request, and the external storage unit C is immediately allowed to be used as a consistent replica in which the update of the external storage unit D is reflected. After completion of the storage area multiple write restarting request, the synchronization status of the data cache is canceled by data synchronization canceling unit (502). After the cancellation of the synchronization status, the transaction B (504) restarts access to the data cache and is allowed to write data into the main storage area and arbitrarily write data into the external storage unit C. Since the multiple write status is restarted at this time, the updated data is also doubly written into the external storage unit D.

Figure 6:
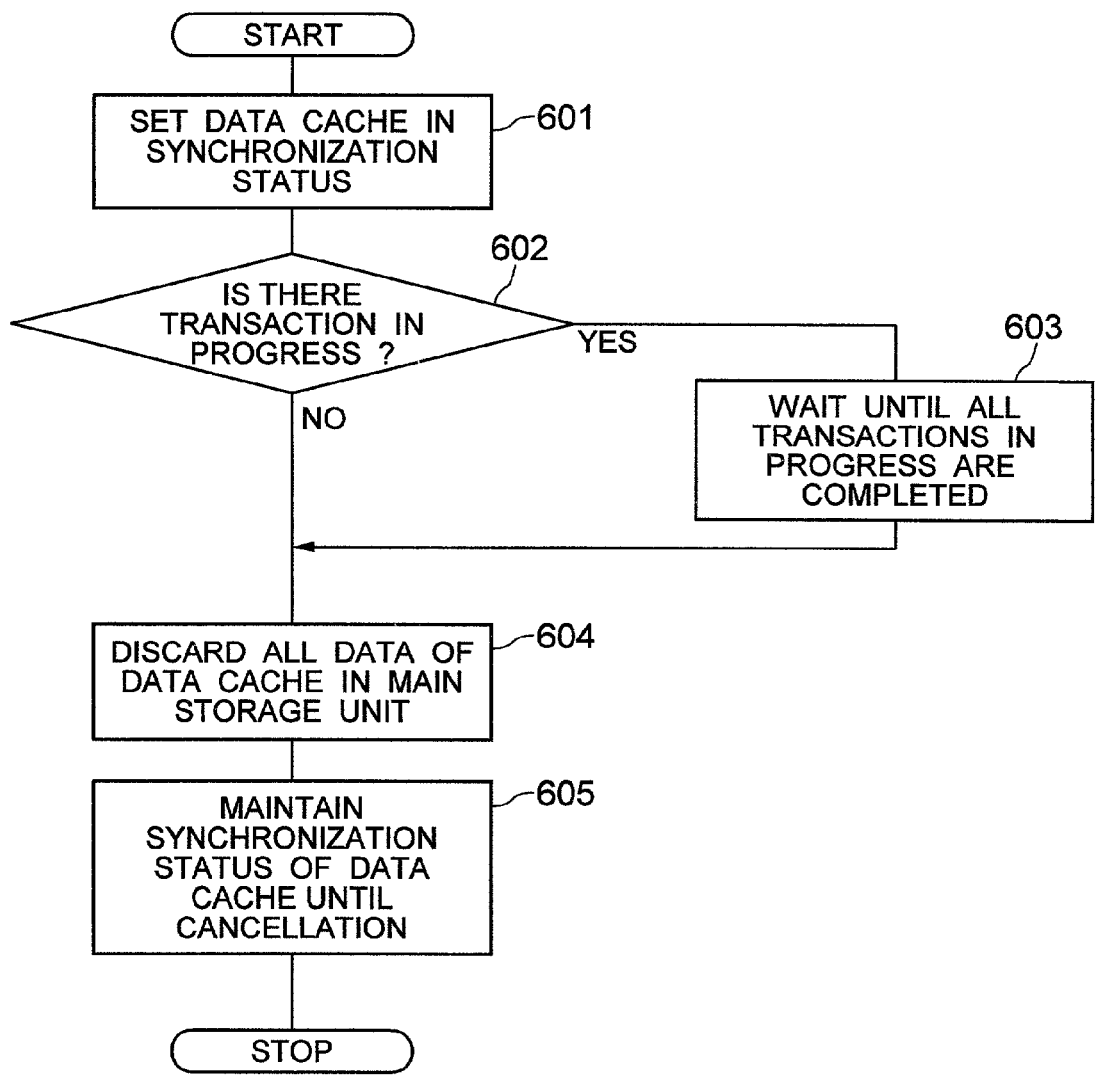
FIG. 6 is a flow chart of the data synchronizing unit of the present invention.

FIG. 6 is a flow chart of another data synchronizing unit of the present invention. In step 601, the data cache in the main storage is set in a synchronization status. In step 602, it is decided whether or not there is any transaction in progress. If there is some transaction in progress, the system waits until all transactions in progress are completed in step 603. If there is no transaction in progress, all data in the data cache in the main storage unit is erased in step 604. In step 605, the synchronization status of the data cache is maintained until it is canceled, and the processing of the data synchronizing unit 2 is completed.

Figure 7:
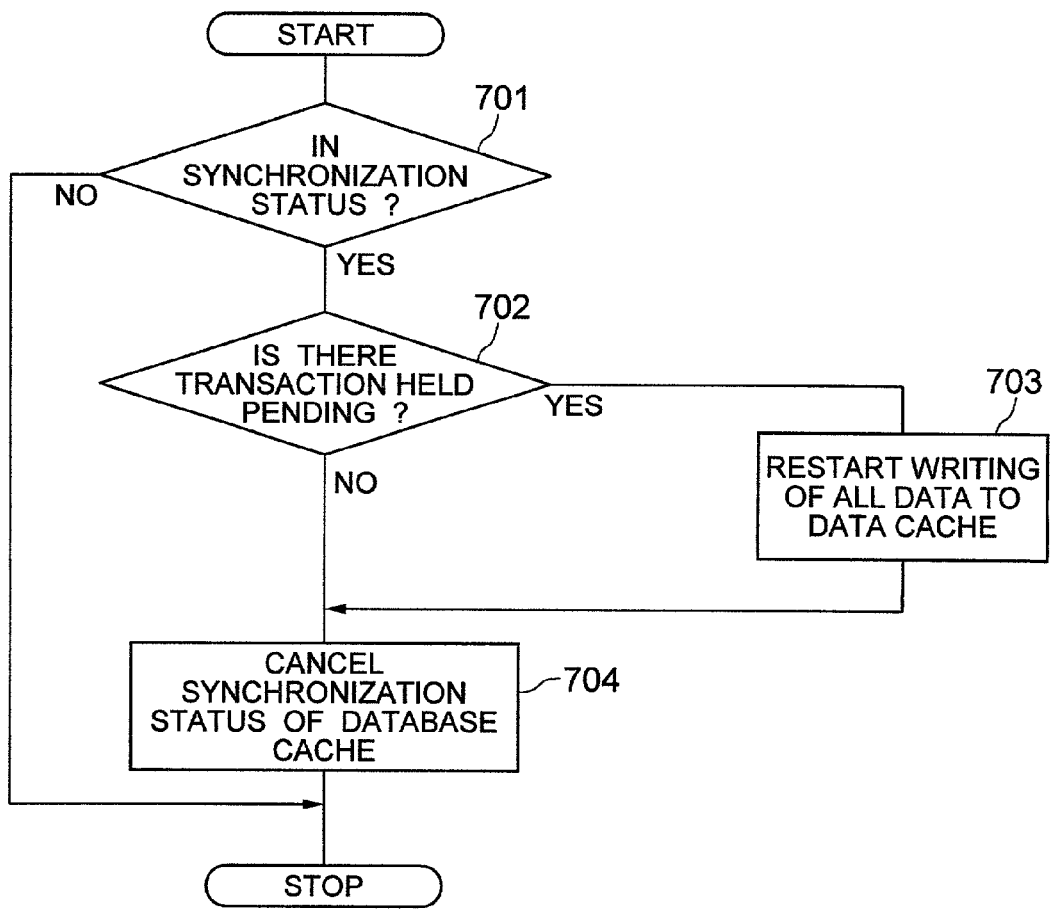
FIG. 7 is a flow chart of the data synchronization canceling unit of the present invention.

FIG. 7 is a flow chart of the other data synchronization canceling unit of the present invention. In step 701, it is decided whether or not the system is in a synchronization status. If it is not in the synchronization status, the processing of the data synchronization canceling unit 2 is completed. If it is in the synchronization status, it is decided in step 702 whether or not there is any pending transaction in progress. If there is some transaction in progress, a write of the updated data into the data cache is restarted in step 703. If there is no transaction in progress, the system moves on to the next processing. In step 704, the synchronization status of the data cache is canceled, and the processing of the data synchronization canceling unit 2 is completed.

Figure 8A:
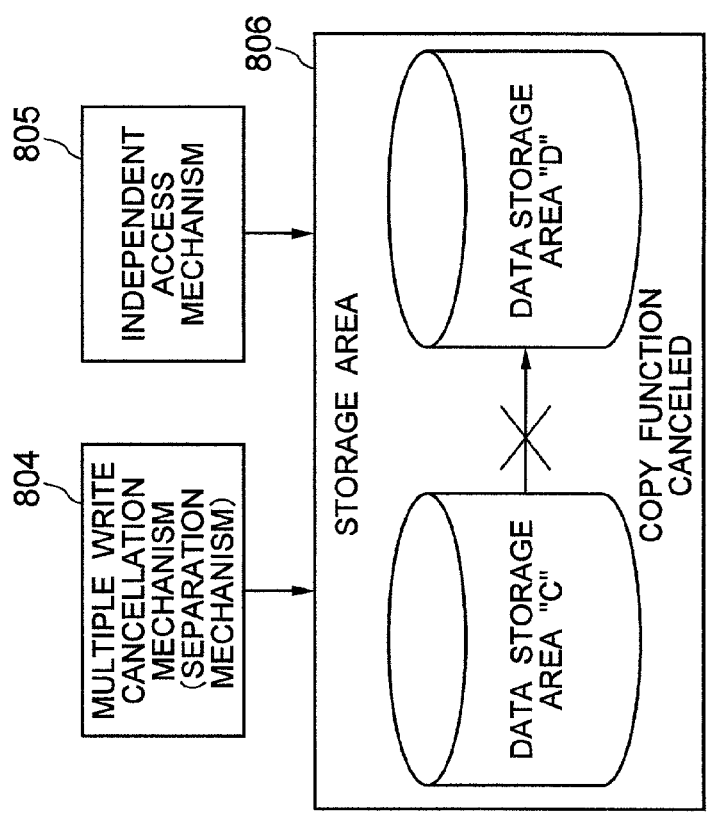
FIG. 8A is a block diagram of a multiple write mechanism unit.

FIG. 8A is a block diagram of a multiple write mechanism unit. This unit is constructed of a multiple write mechanism 801, a multiple write restarting mechanism 802 and a data storage area 803. When a multiple write request is received, the multiple write mechanism 801 allows the data written in the data storage area C to be also reflected in the data storage area D. Furthermore, when a multiple write restarting request is received, the multiple write restarting mechanism 802 restarts the multiple write status for a plurality of data areas which has been accessed independently.

Figure 8B:
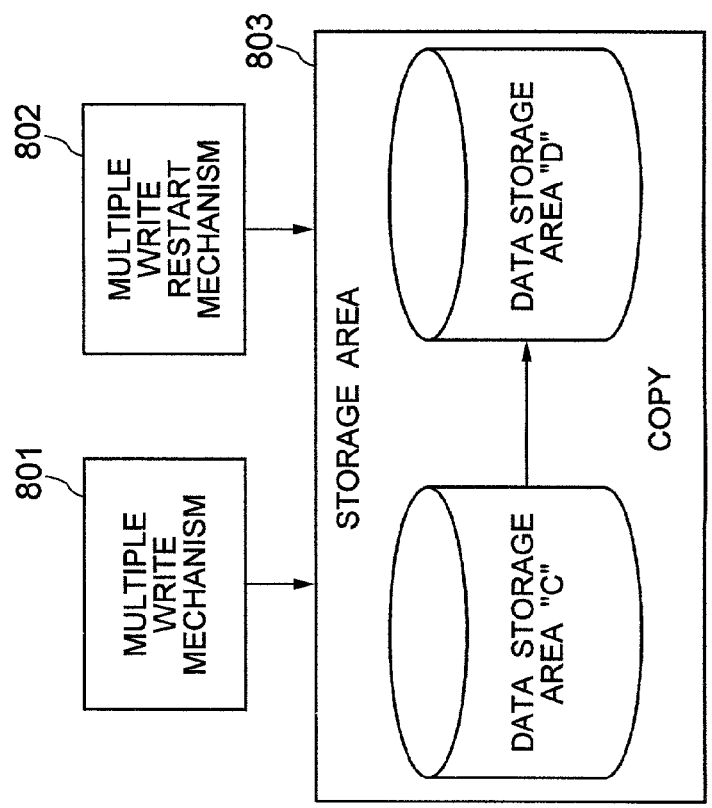
FIG. 8B is a block diagram of a multiple write cancellation mechanism unit.

FIG. 8B is a block diagram of a multiple write cancellation mechanism unit. This unit is constructed of a multiple write cancellation mechanism (separation mechanism) 804, an independent access mechanism 805 and a data storage area 806. When a multiple write status cancellation request is received, the multiple write cancellation mechanism 804 separates the storage area, stops the processing of reflecting the data written in the data storage area C in the data storage area D, and the independent access mechanism 805 sets a status in which data can be written into the respective data storage areas independently.

FIG. 9 is a status matrix about an input/output operation for an external storage unit through the data cache area of the present invention. Each of statuses a-f shows the status of the data cache and shows how the data cache acts on a transaction generated according to the attribute of the transaction. Status "a" corresponds to a normal status in FIGS. 2 and 5, status "b" and status "c" correspond to the synchronization starting status in FIG. 2, status "d" corresponds to the synchronization in progress status in FIG. 2, and status "e" and status "f" correspond to the synchronization status in FIG. 5. When a status in the figure is "permitted", the transaction can access the external storage unit through the data cache. In the case of "prohibited", the transaction cannot access the data cache. "Pending" indicates that after the status of the data cache changes, the transaction is held on standby until it becomes accessible.

Figure 10:
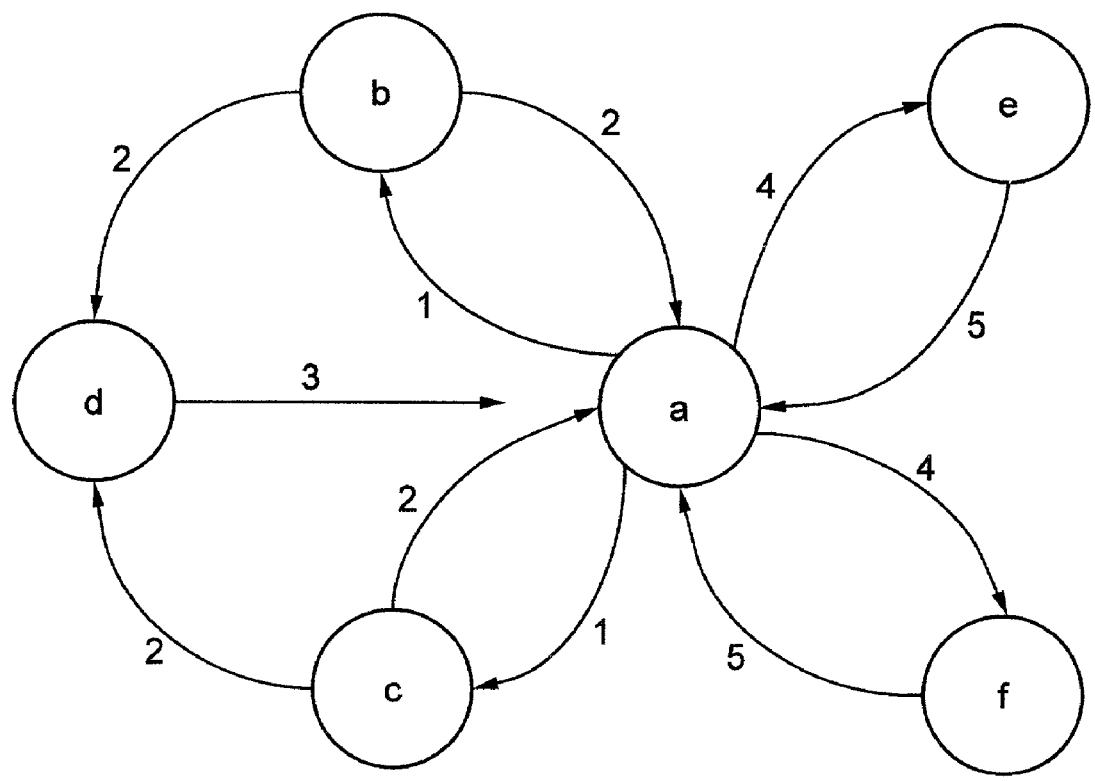
FIG. 10 is a status transition diagram of the data cache of the present invention.

FIG. 10 is a status transition diagram of the data cache of the present invention. Each of statuses a–f corresponds to the status of the data cache shown in FIG. 9. Each of transitions 1–5 indicates the type of transition. The timing of transition 1 is when the data synchronizing unit 1 is executed. The timing of transition 2 is when the transaction in progress is completed and the updated data in the data cache is written into the external storage unit (b→d, c→d), or when the data synchronization canceling unit 1 is executed (b→a, c→a). The timing of transition 3 is when the data synchronization canceling unit 1 is executed. The timing of transition 4 is when the data synchronizing unit 2 is executed (a→e, a→f). The timing of transition 5 is when the transaction in progress is completed and the entire data in the data cache is erased and the data synchronization canceling unit 2 is executed.

This completes the explanation of the first embodiment and the effects of this embodiment will be summarized below. The data synchronizing unit 1 and data synchronization canceling unit 1 can minimize the influence of the on-line processing application side on processing of transactions, and provide timing for creating a consistent replicated database. Furthermore, when the replicated database is updated by batch processing and reflected in the on-line processing application side, the data synchronizing unit 2 and data synchronization canceling unit 2 can minimize the influence of the on-line processing application side on processing of transactions and replicate the database updated by batch processing on the on-line side. Thus, in the first embodiment, when part of a database area multi-written or replicated in the external storage unit is separated and a physical replicated database is created, it is possible to maintain consistency of the replicated database while letting transaction processing go on. Furthermore, it is also possible to maintain consistency of the database while letting transaction processing go on when the replicated database and replication source database are restored to a multiple write status again.

Then, a second embodiment will be explained.

This is an example where the physically replicated data in the first example is accessed as a replicated database using the table/index definition of the replication source.

FIG. 11 shows an example of a definition format of storage area management information to access a table or index created in the replicated database. Generally, a database is provided with a plurality of data storage areas and the name of a data storage area in which a table or index is created is specified. The correspondence between the table/index names and area names is registered in the table/index storage area management table (1101). In this example, a table Table1 (1102) and an index Idx1 (1103) associated with the table Table1 are defined in an area "a". Physical information necessary to access the data storage area is registered in a data directory information management table (1104). The database name of an area, page size and the number of pages are set in a common physical information section (1105). Access path information in an actual storage unit, which corresponds to the name of a data storage area arbitrarily defined in the database management system, is set in an access path information section (1106). In the case of the replication area, the name of the replication source area, the number of replications, the generation identifier and the status are set in the access path information section. The number of replications is only set in the area which is the source of replication. The generation identifier is information for identifying a plurality of replication areas replicated from the same area. There are two types of status; current and sub, and when no special request for selecting a replication area is specified from a client, the area in the current status is uniformly accessed. In this example, there are two replication areas corresponding to the area "a", which is the replication source, and the current status is set in the area "a" (1107). The area "b" is a replica of the area "a", its generation identifier is "1" and its status is sub (1108). Furthermore, the area c is a replica of the area "a" and its generation identifier is "2" and its status is sub (1109).

Figure 12:
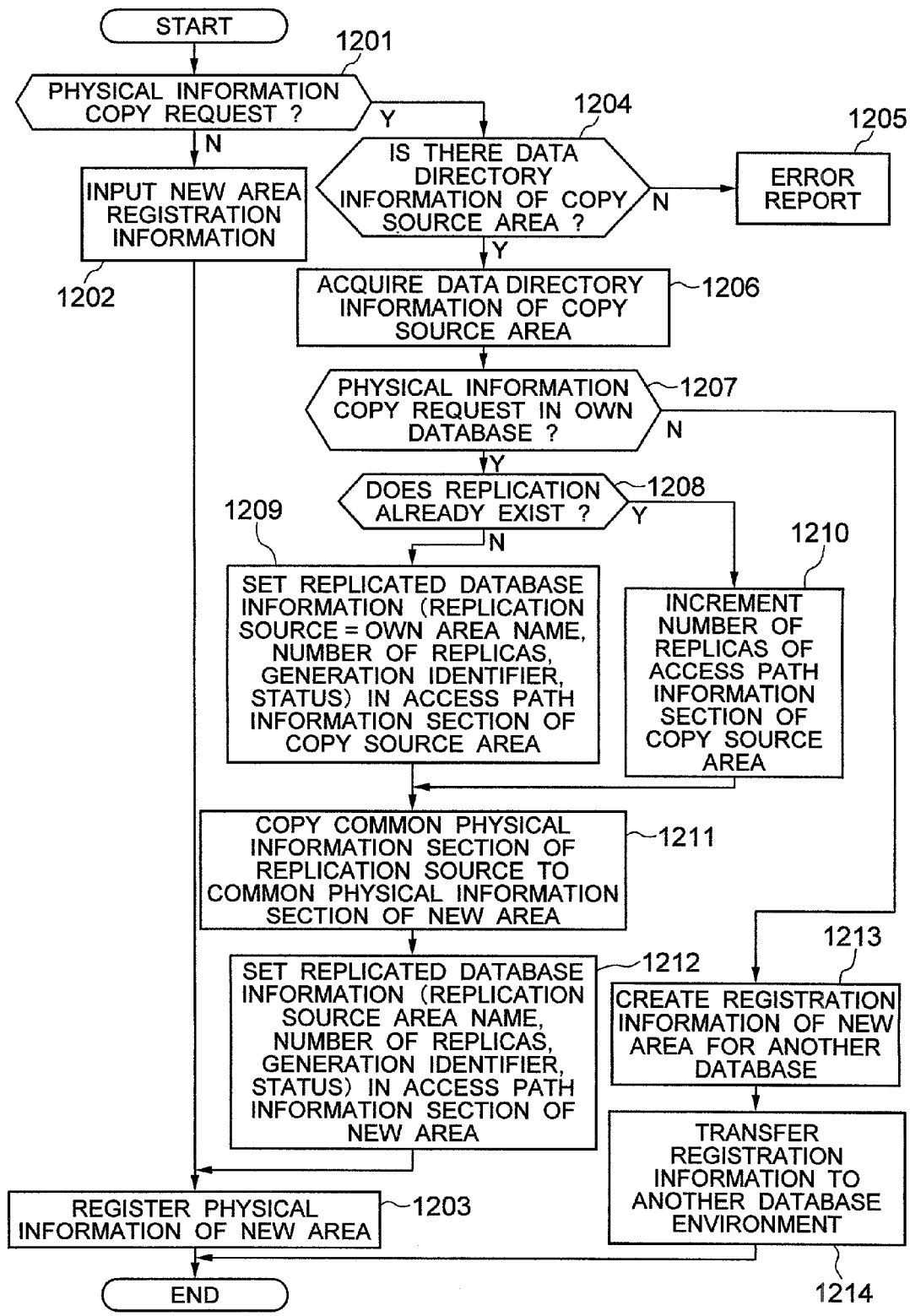
FIG. 12 is a flow chart of units related to data directory information copying/registration of the present invention.

FIG. 12 is a flow chart of the data directory information dynamic copying unit (117), data directory information dynamic registering unit (121) and data directory generation managing unit (122). In step 1201, it is decided whether the request is a request for copying data directory information or a request for registration. In the case of a request for registration, a new area registration information file is input (step 1202) and registered in a data directory information management table (1104) (step 1203), and then the processing is terminated. In the case of a request for a copy, a specified copy source area is searched from the data directory information management table (1104) in FIG. 11 in step 1204. If no specified area name is defined, an error is reported (step 1205). In step 1206, the data directory information of the specified copy source is acquired. In step 1207, it is decided whether the request is for a copy to the own database or for a copy to another database. If it is a request for a copy to the own database, it is decided in step 1208 whether or not a copy area already exists in the copy source area. If there is no replication area in the specified replication source area, as the replication area information of the access path information section (1106), the own area name is set as the name of the replication source area, "1" is set as the number of replicas, "0" is set as the generation identifier and the current status is set as the status (step 1209). If the replication area is already defined, the number of replicas is simply incremented (step 1210). The common physical information section (1105) of the area to be newly registered is copied from the data directory information of the copy source area (step 1211). The name of the replication source area, the generation identifier of an arbitrarily specified replication area, the sub status as the status and a newly specified access path name as the access path name are set in the access path information section (1106) (step 1212). The data directory information created is registered in the data directory information management table (1104), and the processing is terminated (step 1213). In the case of a request for a copy to another database, a physical area registration information file for another database (118) is created in step 1213. In step 1214, the registration information is transferred to the specified other database environment, and the processing is terminated.

FIG. 13 is an example of a data format of a program execution management table of a program for accessing a replicated database. The program execution management table (1301) records physical area access options (1302) of the replicated database specified for the client unit or the administrator's operation instruction (1303). In the case of a direct area request, ON is set in the direct area specification flag. In the case of a generation access request, ON is set in the generation access specification flag and the request generation identifier is set in the generation identifier.

Figure 14:
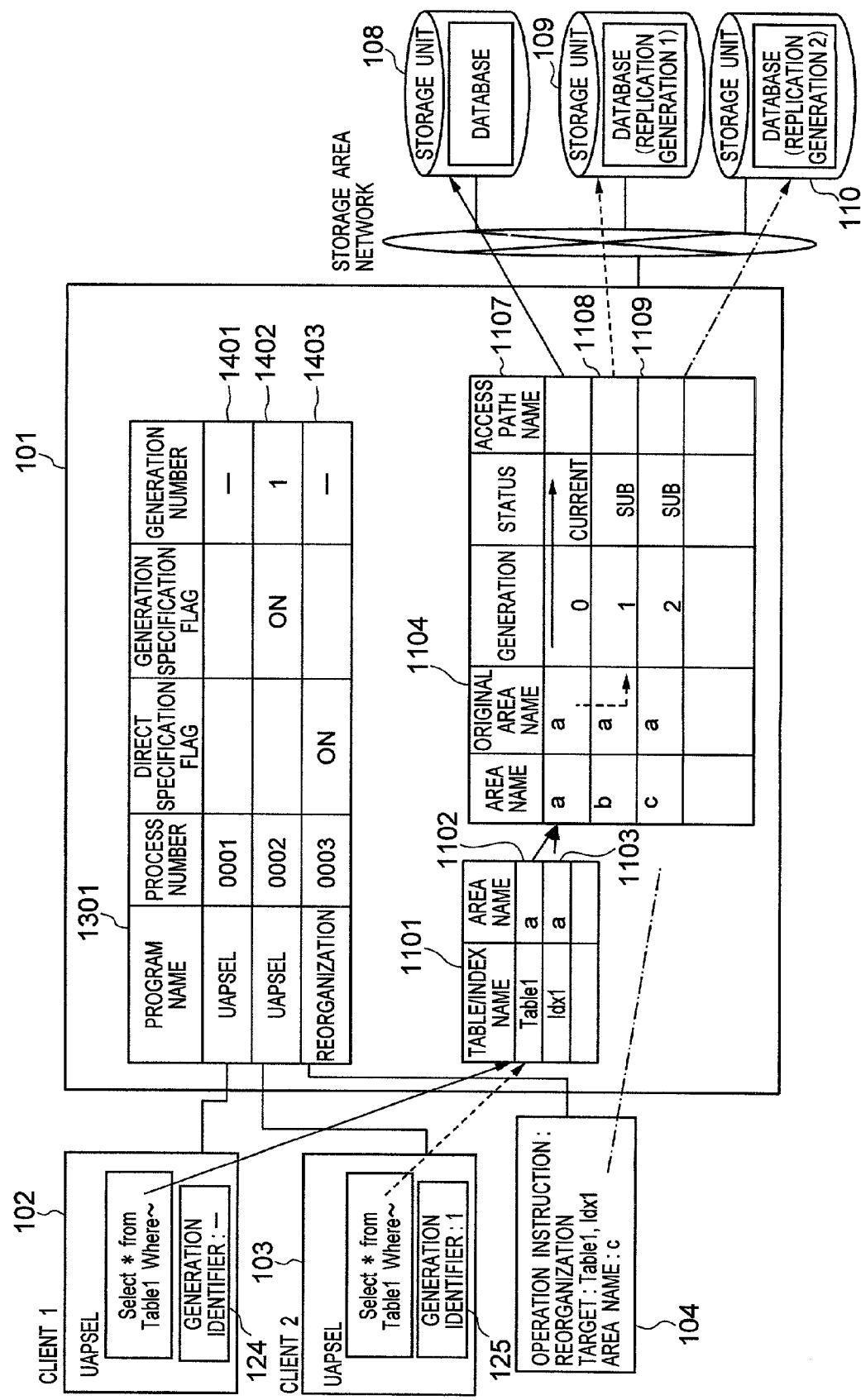
FIG. 14 illustrates an operation of accessing the replicated database based on the definition information in FIGS. 11 and 12.

FIG. 14 shows a system whereby access areas are allocated according to requests using the management tables shown in FIGS. 11 and 13 when a plurality of replication areas exists. This shows an example where when there are a database 108, a replicated database 109 of the generation identifier "1" of the database 108 and a replicated database 110 of the generation identifier "2" of the database 108, the database access requests from the client 1 (102), client 2 (103) and operation instruction (104) are allocated to the specified databases by the client access target setting units (126 and 127), access target setting unit (129) and access target allocating unit (130).

The client 1 (102) does not specify generation access to the client execution environment file (124). Thus, the area which the client 1 wants to access is an area in the current status. Since there is no generation access specification in the client execution environment file (124), the client access target setting unit (126) sets no information for replication access in the database communication area. The access target setting unit (129) of the database access processing section (128) sets a program name "UAPSEL" and process number "0001" in the program execution management table, but since there is no information for replication access, the direct specification flag and generation specification flag remain OFF (1401). The database access processing section (128) determines the page position of a table Table1 or index Idx1 according to the program request to perform page access to the database. In the target allocation processing carried out by the access target allocation setting unit (130), the storage area of the table Table1 or index Idx1 is searched from the table/index storage area information management table (1101) and a definition area name "a" is acquired. Since no physical access option of the execution management table of the program is set, the area in a current status of the storage area "a" is searched from the data directory information table (1104). As a result, the area "a" (1107) is determined as the access target physical area and the replication source database 108 is accessed.

The client 2 (103) specifies the generation identifier "1" in the client execution environment file (125) as the generation access specification. The client access target setting unit (127) sets a generation access request and generation identifier "1" in the database communication area. The access target setting unit (129) of the database access processing section (128) sets a program name "UAPSEL" and process number "0002" in the program execution management table, sets the generation specification flag to ON and sets the specified generation identifier "1" (1402). The database access processing section (128) determines the page position of the table Table1 or index Idx1 according to the request of the program and performs page access to the database. Since the generation specification flag is ON, the target allocation processing carried out by the access target allocation setting unit (130) searches for an area which is the replication area of the storage area "a" of the table Table1 or index Idx1 and whose generation identifier is "1" from the data directory information table (1104). As a result, the area "b" (1108) is determined as the target physical area and the replicated database 109 of the replication generation "1" is accessed.

An operation instruction (103) directly specifies the target area name "c" as a parameter of the instruction. The access target setting unit (129) of the database access processing section (128) sets "reorganization" as the program name and "0003" as the process number in the program execution management table and directly sets the specification flag to ON (1403). The database access processing section (128) determines the page position of the table Table1 or index Idx1 according to the request of the instruction and performs page access to the database. The target allocation processing carried out by the access target allocation setting unit (130) searches for the data directory information of the storage area name "c" from the data directory information table (1104). As a result, the area "c" (1109) is determined as the target physical area and the replicated database 110 of the replication generation "2" is accessed.

Furthermore, when the replication access information is not specified as a parameter of the instruction by an operation instruction (103), the current area is accessible, and when the generation identifier is specified, the area of the specified generation is accessible.

The database access section (128) performs exclusive control in table or access data units and it is possible to avoid generation of exclusive contention among replicated databases by assigning the exclusive resources the actual access area names or generation identifies of the access areas which are determined by the access target allocation setting unit (130).

Figure 15:
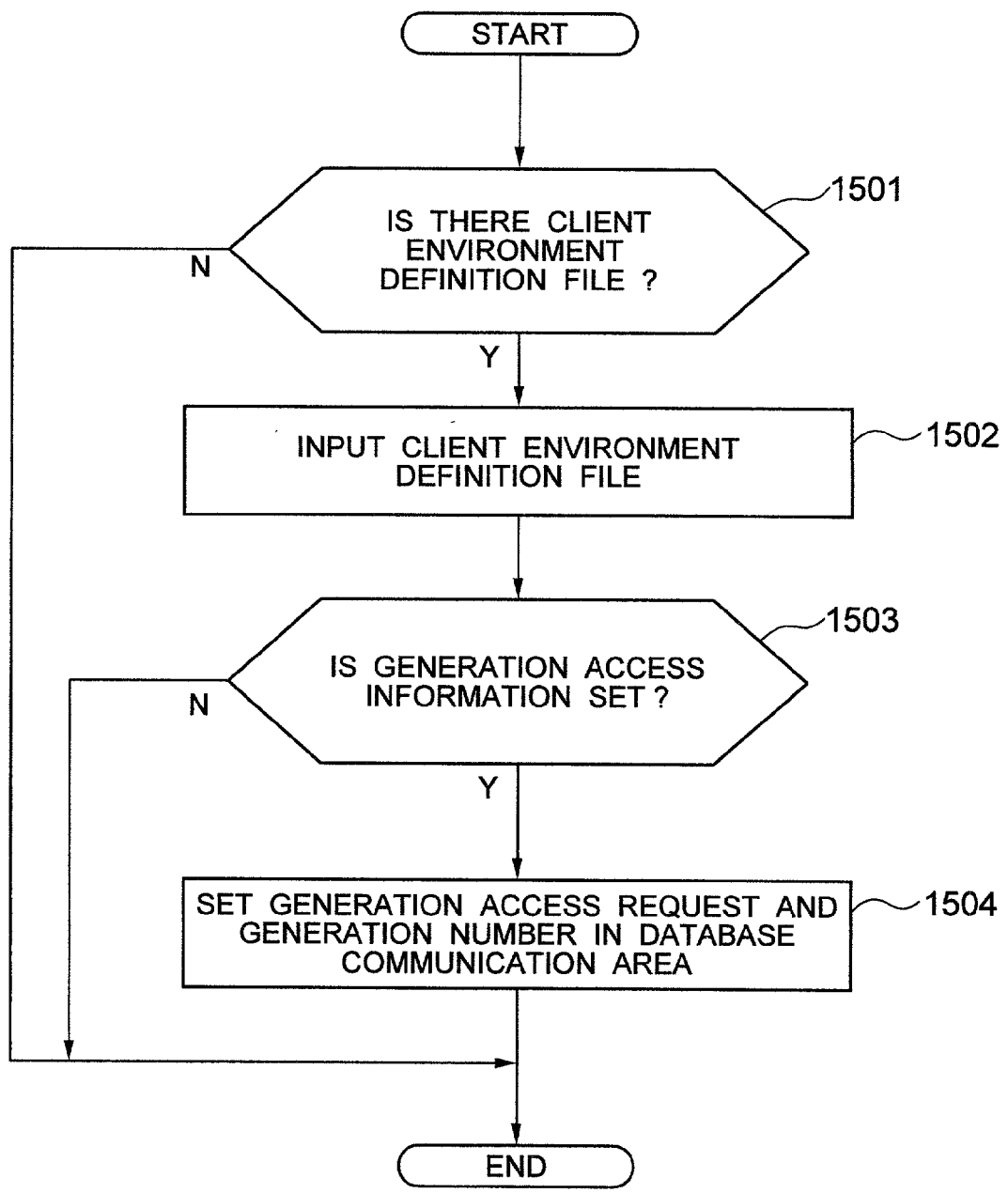
FIG. 15 is a flow chart of a client-related operation by the access target setting unit of the present invention.

FIG. 15 is a flow chart of operations (126, 127) related to the client environment of the access target setting unit of the present invention. In step 1501, it is decided whether or not a client environment definition file exists in the execution environment of the program. If the file does not exist, the processing is terminated. If the file exists, in step 1502, the client environment definition file is input. In step 1503, it is decided whether or not generation access information is set in the file. If the generation access information is not set, the processing is terminated. If the generation access information is set, a generation specification access request and generation identifier are set in the database communication area, and the processing is terminated.

Figure 16:
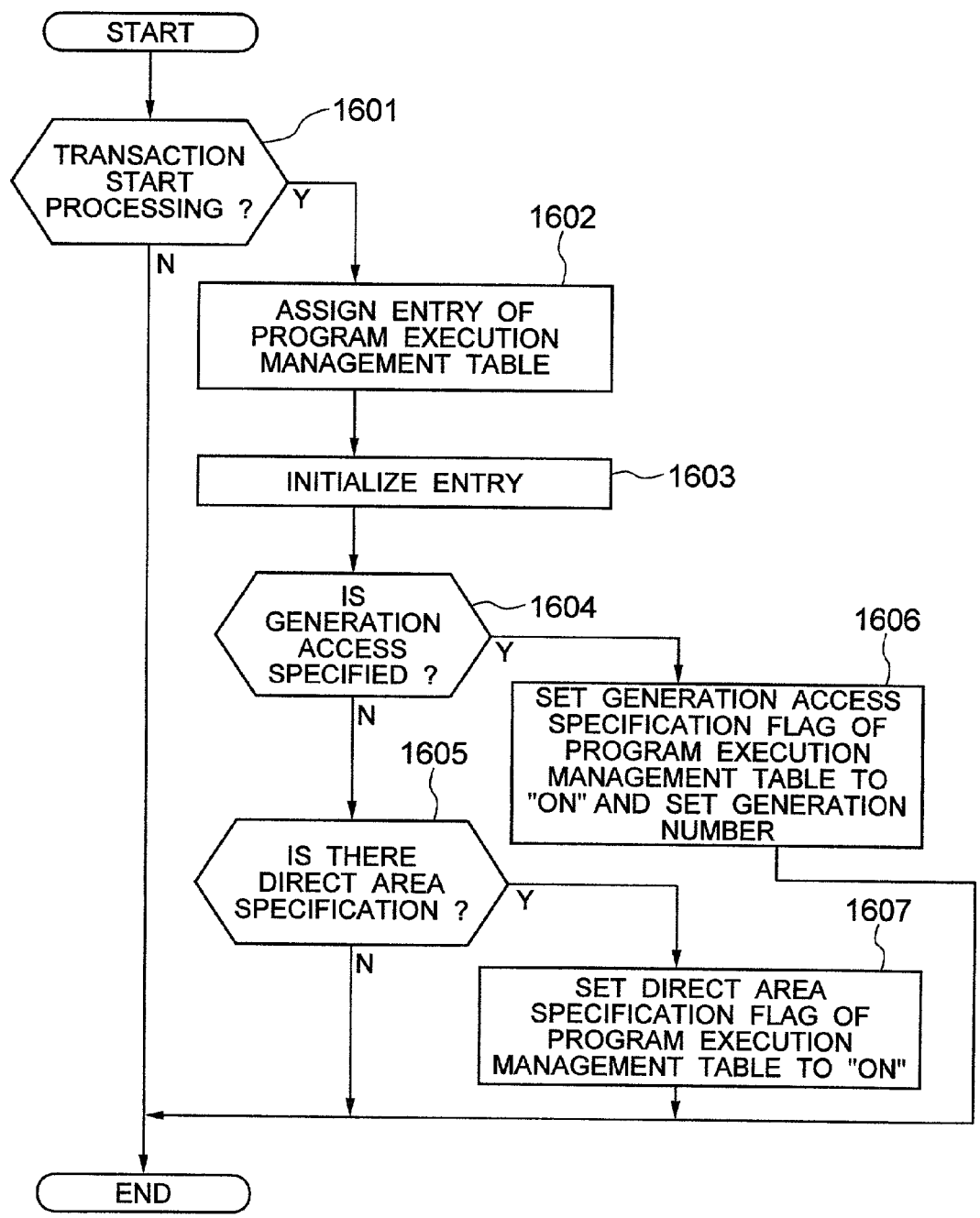
FIG. 16 is a flow chart of an operation related to a database management system by the access target setting unit of the present invention.

FIG. 16 is a flow chart related to an operation inside the database management system of the access target setting unit (129) of the present invention. In step 1601, it is decided whether or not the operation is transaction starting processing. If the operation is not the transaction starting processing, the processing is terminated. If the operation is the transaction starting processing, an entry of the program execution management table (1301) is assigned. In step 1602, the entry is initialized. In step 1604, it is decided whether or not there is a generation access request. If there is no generation access request, it is decided in step 1605 whether or not there is a direct area specification. If there is no direct area specification, the processing is terminated without setting any physical area access option information. In this case, this program is specified so as to access the physical area in the current status. In step 1604, if there is a generation access request, the generation specification flag of the physical area access option information is set to ON, the specified generation identifier is set, and the processing is terminated. If the direct area is specified in step 1605, the direct area specification flag of the physical area access option information is set to ON, and the processing is terminated.

Figure 17:
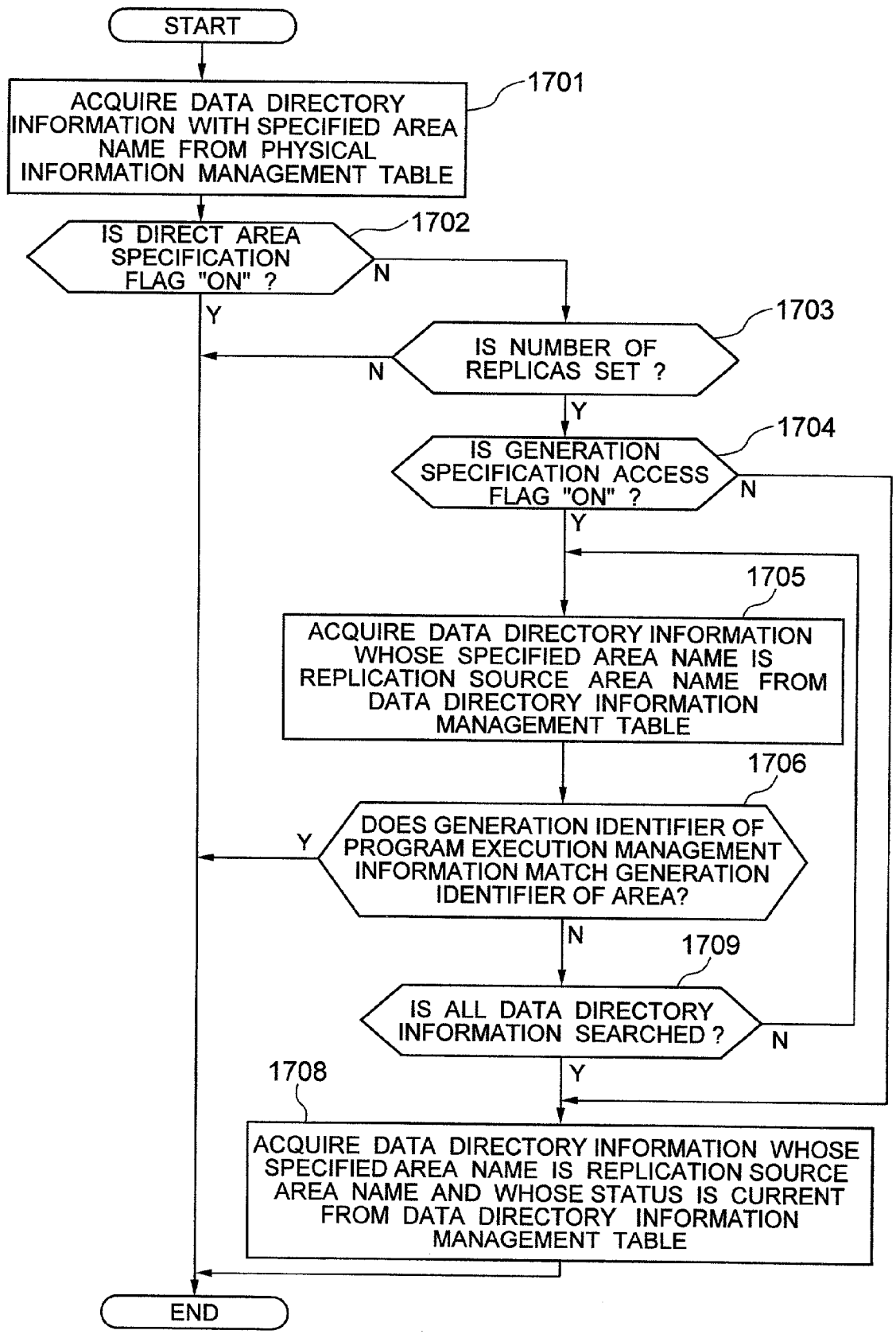
FIG. 17 is a flow chart of the access target allocating unit of the present invention.

FIG. 17 is a flow chart of the access target allocating unit (130) of the present invention. In step 1701, the data directory information with the area name specified from the data directory information management table (1104) is acquired. In step 1702, it is decided whether or not the physical area access option of the program execution management information (1301) of the program in question is direct area specification. If it is direct area specification, the processing is terminated. If it is not direct area specification, it is decided in step 1703 whether or not the number of replicas of the area in question is set. If the number of replicas is not set, there is no replication area, and so the processing is terminated. If the number of replicas is set, it is decided in step 1704 whether or not generation access is specified. If generation access is specified, the data directory information whose specified area name is the replication source area name is acquired from the data directory information management table (104). In step 1706, it is decided whether or not the generation identifier of the acquired data directory information matches the generation identifier of the program execution management information (1301). If the generation identifier matches, the processing is terminated. If the generation identifier does not match, it is decided in step 1707 whether or not all data directory information of the data directory information management table (1104) has been searched. If there is still undecided data directory information, the next data directory information is processed. When all data directory information has been searched, no replication area of the specified generation identifier is defined for the specified area. In this case, in step 1708, data directory information whose specified area name is the replication source area name and whose status is current is acquired from the data directory information management table (1104), and the processing is terminated. If generation access is not specified in step 1704, it is current access, and therefore in step 1708, data directory information whose specified area name is the replication source area name and whose status is current is acquired from the data directory information management table (1104), and the processing is terminated.

Figure 18:
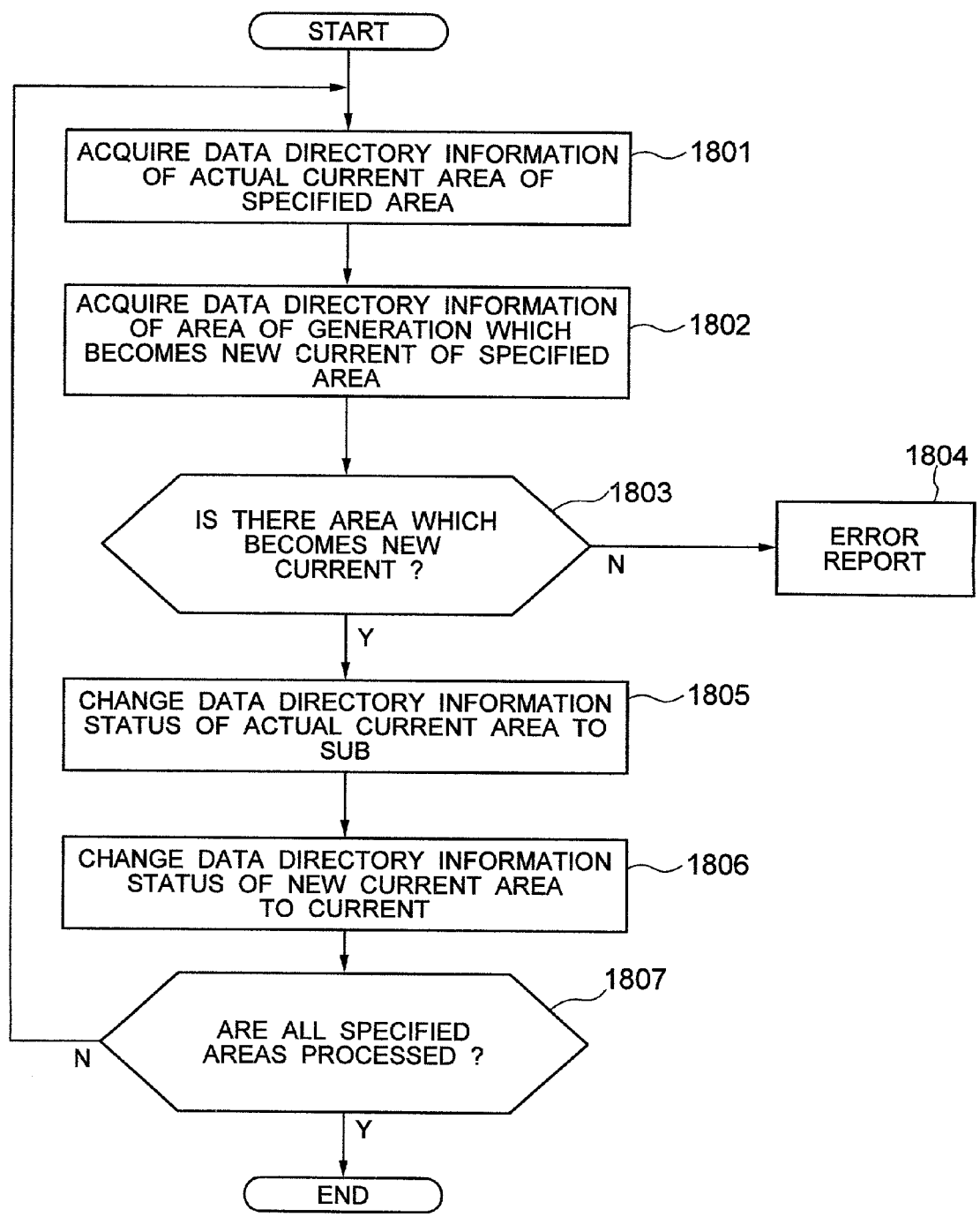
FIG. 18 is a flow chart of the current access generation setting unit of the present invention.

FIG. 18 is a flow chart of the current access generation setting unit (123) of the present invention. In step 1801, data directory information whose specified area name is the replication source area name and whose status is current is acquired from the data directory information management table (1104). In step 1802, data directory information whose specified area name is the replication source area name and which has the generation identifier of the replication generation which is newly set in the current status is searched. It is decided in step 1803 whether or not there is data directory information which is newly set in the current status. If the area does not exist, in step 1804, an error is reported, and the processing is terminated. If the area exists, in step 1805, the status of the data directory information of the current area is changed to a sub status. In step 1806, the status of the data directory information which is newly set in the current status is changed to the current status. It is decided in step 1807 whether or not the area in which the current generation is changed is still specified. If there are still some areas to be changed, the next area is processed. When the change processing of all specified areas is completed, the processing is terminated. Client access targets can be changed at once for the replicated databases.

This completes the explanation of the second embodiment. Finally, these effects are summarized below. The data directory information dynamic copying procedure and the data directory information dynamic registration procedure of this embodiment allow the data directory information of a replicated database to be created at any given time. Furthermore, the access target allocation procedure allows the access target database to be allocated based on the data directory information of either the copy source or copy target. This allows the database management system of the replication source or another database management system to arbitrarily select and access a database in the replicated logical volume. Furthermore, the data directory information dynamic copying procedure and the data directory information dynamic registration procedure of this embodiment allow a generation identifier to be added to the newly created data directory information, and the access target allocation procedure allows access target databases to be allocated according to the corresponding generation identifiers or the names of the data directory information. Furthermore, the access target setting procedure allows an arbitrary database to be selectable according to the corresponding generation identifier or the name of the newly created data directory information. Thus, even if the database group to be accessed by batch processing does not match a set of the replicated database group to be replicated in logical volume units, an arbitrary replicated database group can be uniquely selected as the database group to be accessed.

Then, a third embodiment will be explained. This embodiment of the present invention will describe an operation system whereby data is extracted from an on-line transaction processing system and used in systems specific to progressing applications such as processing applications executing a customer analysis, profit management or reporting using the latest data in the on-line transaction processing system as follows.

First, conventional operation systems will be explained using FIGS. 19, 20 and 21.

Figure 19:
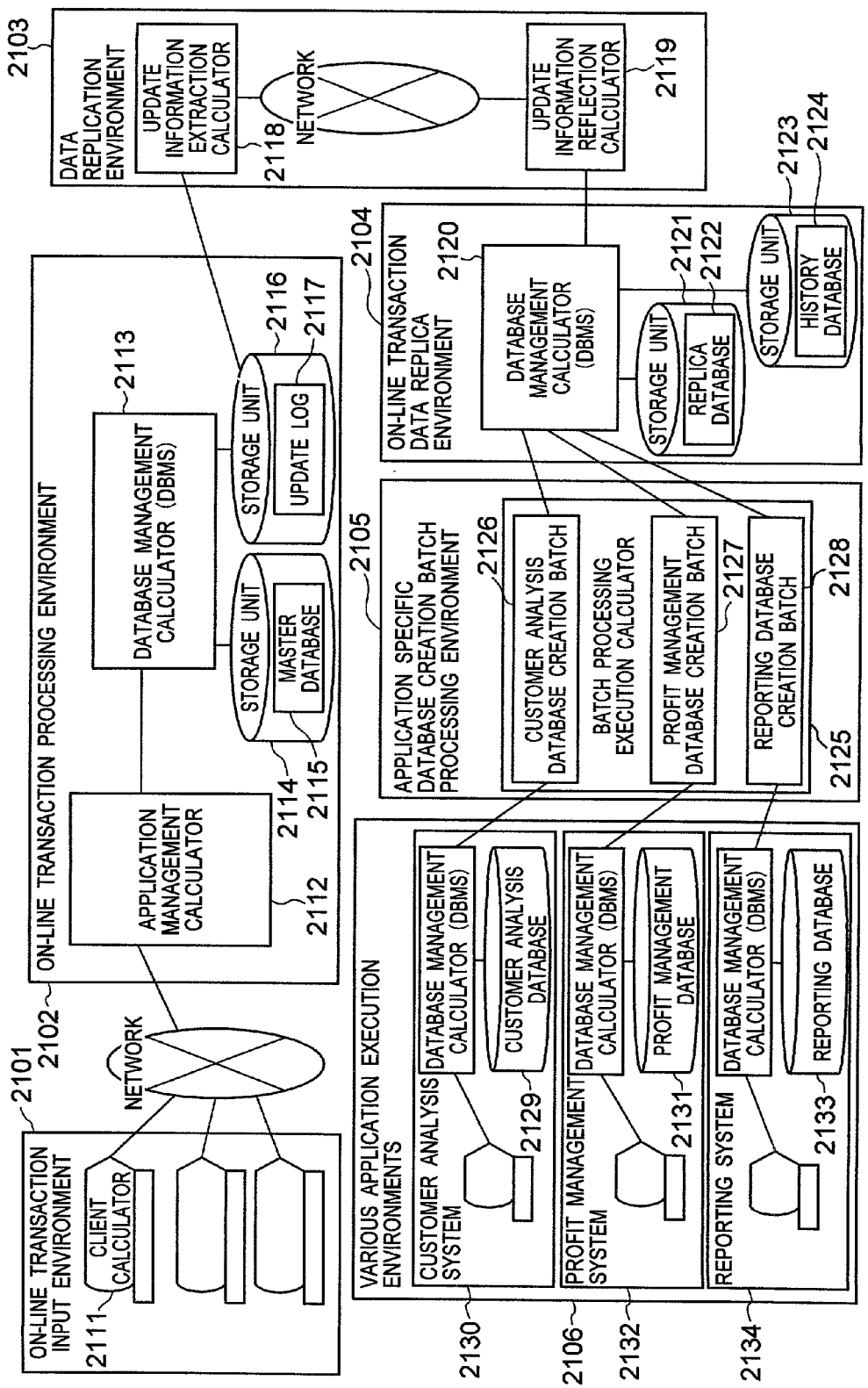
FIG. 19 is a block diagram of an overall system connecting an on-line transaction processing system and systems specific to processing applications such as analysis through data replication.

FIG. 19 is a block diagram of an overall system connecting an on-line transaction processing system and systems specific to processing applications such as analysis through data replication. The system is constructed of an on-line transaction input environment 2101, an on-line transaction processing environment 2102, a data replication environment 2103, an on-line transaction data replica environment 2104, an application specific database creation batch processing environment 2105 and various processing application execution environments 2106. Each environment is constructed as follows.

The on-line transaction input environment 2101 is constructed of a plurality of client calculators 2111 to input on-line transactions. The on-line transaction processing environment 2102 is constructed of an application management calculator 2112 to accept and execute on-line transaction requests, a database management calculator 2113 that manages on-line transaction data, a storage unit 2114 in which the database management calculator 2113 stores on-line transaction data, a master database 2115 inside the storage unit 2114, a storage unit 2116 that stores update logs of on-line transaction data storage processing in the database management calculator 2113, and an update log 2117 inside the storage unit 2116.

The data replication environment 2103 is constructed of an update information extraction calculator 2118 that extracts updated data of the master database by an on-line transaction based on the update log 2117 and sends to the reflecting side, and an update information reflection calculator 2119 that receives the updated data and reflects it in the online transaction data replica environment 2104.

The on-line transaction data replica environment 2104 is constructed of a database management calculator 2120 that manages replicas of online transaction data and transaction history data based on the updated data, a storage unit 2121 in which the database management calculator 2120 stores replicas of on-line transaction data, a replica database 2122 inside the storage unit 2121, a storage unit 2123 in which the database management calculator 2120 stores on-line transaction history data, and a history database 2124 inside the storage unit 2123.

The application specific database creation batch processing environment 2105 is constructed of a batch processing execution calculator 2125 for creating various application specific databases required in various processing application execution environments 2106 based on the replica database 2122 and history database 2124, a customer analysis database creation batch 2126, a profit management database creation batch 2127, and reporting database creation batch 2128.

The various processing application execution environments 2106 are constructed of a customer analysis system 2130 using a customer analysis database 2129, a profit management system 2132 using a profit management database 2131, and a reporting system 2134 using a reporting database 2133.

Figure 20:
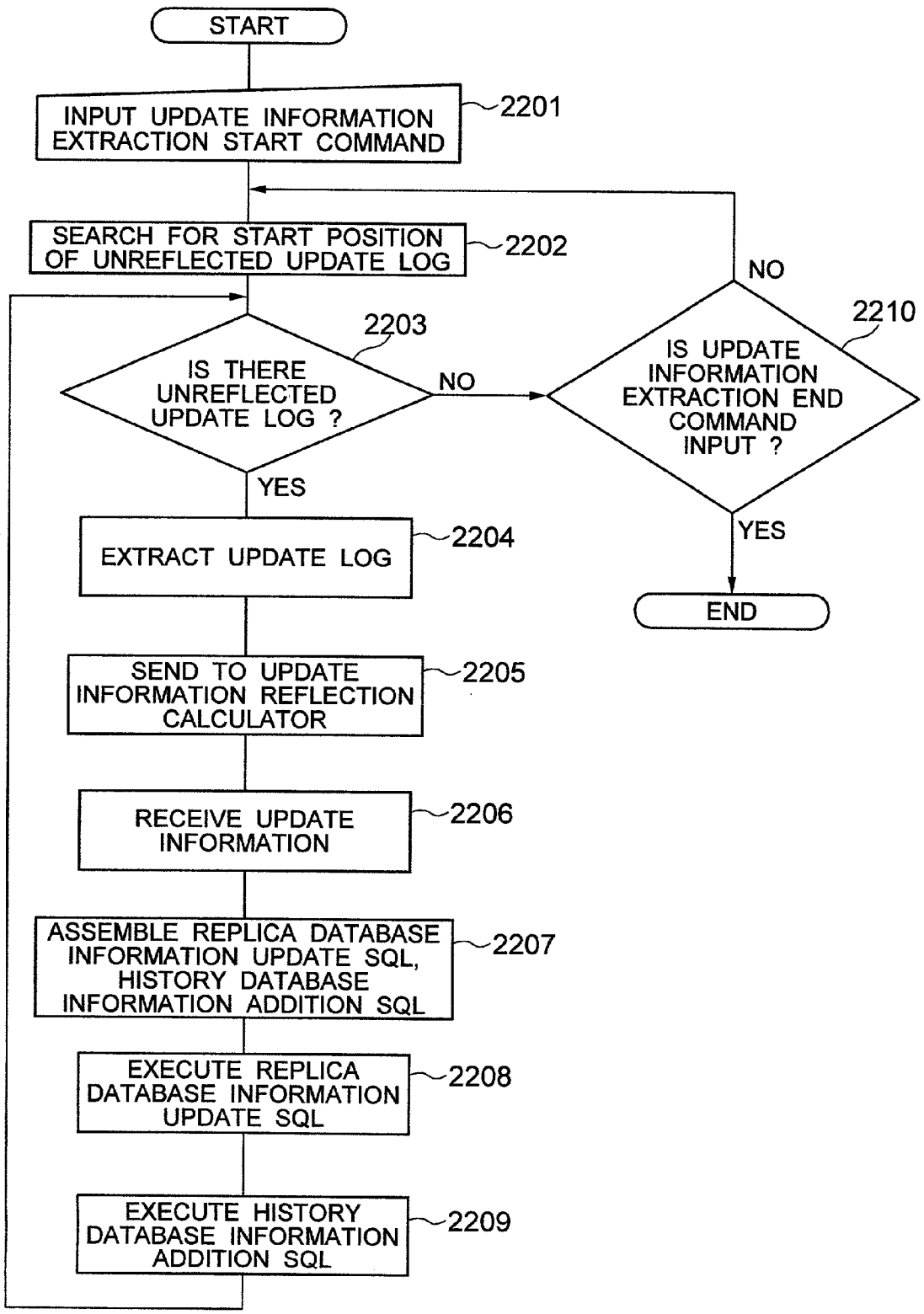
FIG. 20 is a flow chart of processing for creating a replica database 2122 and history database 2124.

FIG. 20 is a flow chart of processing for creating a replica database 2122 and history database 2124. The user enters an update information extraction start command into the update information extraction calculator 2118 (step 2201). The update information extraction calculator 2118 searches for the start position of the unreflected update log from the update log 2117 (step 2202) to decide whether or not there is an unreflected update log in the update log 2117 (step 2203). When there is an unreflected update log, the update information extraction calculator 2118 extracts an update log from the update log 2117 (step 2204). The update information extraction calculator 2118 further sends the extracted update log to the update information reflection calculator 2119 (step 2205). The update information reflection calculator 2119 receives the update log sent (step 2206) and constructs an update SQL of the replica database 2122 and an update history addition SQL for the history database 2124 (step 2207). Then, the update information reflection calculator 2119 executes the update SQL of the replica database 2122 on the database management calculator 2120 (step 2208). Finally, the update information reflection calculator 2119 executes the update history addition SQL for the history database 2124 on the database management calculator 2120 (step 2209). By repeating the procedure from step 2204 to step 2209 until there is no more unreflected update log, the replica database 2122 and history database 2124 are created. When there is no unreflected update log (step 2203), it is confirmed whether or not an update information extraction end command is input to the update information extraction calculator 2118 (step 2210). If no update information extraction end command is input, the unreflected update log is confirmed again (steps 2202 and 2203). When an update information extraction end command is input to the update information extraction calculator 2118 (step 2210), a series of processing is terminated.

Figure 21:
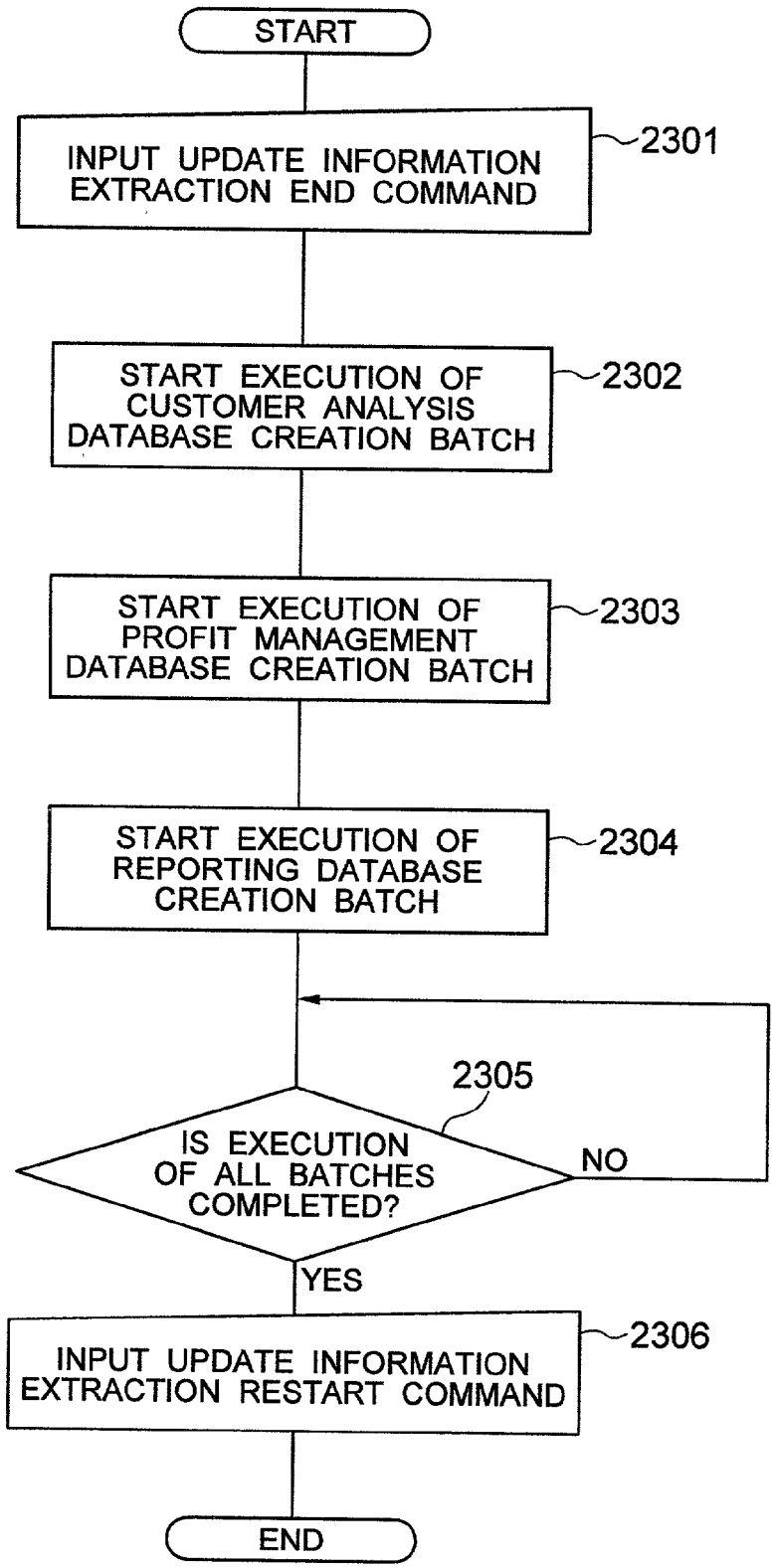
FIG. 21 is a flow chart of processing for creating databases for various processing applications.

FIG. 21 is a flow chart of processing for creating databases for various processing applications. When application specific database creation batches 2126, 2127 and 2128 are in progress, it is necessary to stop addition/update processing of the replica database 2122 and history database 2124 in order to assure consistency of data. First, before execution of the application specific database creation batches 2126, 2127 and 2128, the user inputs an update information extraction end command to the update information extraction calculator 2118 (step 2301) and stops the addition/update processing of the replica database 2122 and history database 2124. Then, the user starts to execute customer analysis database creation batch 2126, profit management database creation batch 2127 and reporting database creation batch on the batch processing execution calculator (steps 2302, 2303 and 2304). This allows the various processing application databases 2129, 2131 and 2133 to be created while assuring consistency of the replica database 2122 and history database 2124. However, since the update information extraction calculator 2118 cannot start to extract the update log 2117 until all the application specific database creation batches 2126, 2127 and 2128 are completed (step 2305), the update log 2117 in the storage unit 2116 continues to be stored. After confirming that all the application specific database creation batches 2126, 2127 and 2128 have completed, the user inputs an update information extraction restart command to the update information extraction calculator 2118 (step 2306).

The conventional operation system has the following problems. It requires CPU and memory resources to extract update information from the online transaction processing system and reflect the update information in the on-line transaction data replica environment. When business hours for around-the-clock services using the Internet, etc. increase and the amount of on-line transaction increases accordingly, the amounts of data of the master database 2115 and replica database 2122 in FIG. 19 increase and the time for the batch processing execution calculator 2125 in FIG. 19 to execute the application specific batch execution steps 2302, 2303 and 2304 in FIG. 21 is extended. This restricts the processing start time and time available for a processing application such as analysis in the various processing application execution environments 2106 in FIG. 19. Furthermore, the expansion in the amount of on-line transaction leads to an increase of the size of the log 2117 in FIG. 19, making the update information continue to store the update information in the log 2117 until all the application specific database creation batches 2126, 2127 and 2128 in FIG. 19 are completed in step 2305 of FIG. 21, which constrains resources of the storage unit 2116. In addition, when there is a certain sequence in execution of the application specific database creation batches 2126, 2127 and 2128 in FIG. 19 or contention occurs, it is difficult to execute batches simultaneously making more serious the problem that the time for execution of the application specific batch execution steps 2302, 2303 and 2304 in aforementioned FIG. 21 is extended. Furthermore, in the customer analysis system 2130 in FIG. 19, when the customer analysis database 2129 is the counting result of the replica database 2122, if a drill through, that is, accessing the replica database 2122 which stores related detailed data based on the counting result, is carried out, the replica database is updated from the time of counting, which causes a problem of producing a data mismatch.

Then, the operation system of this embodiment will be explained by using FIGS. 22 and 23.

Figure 22:
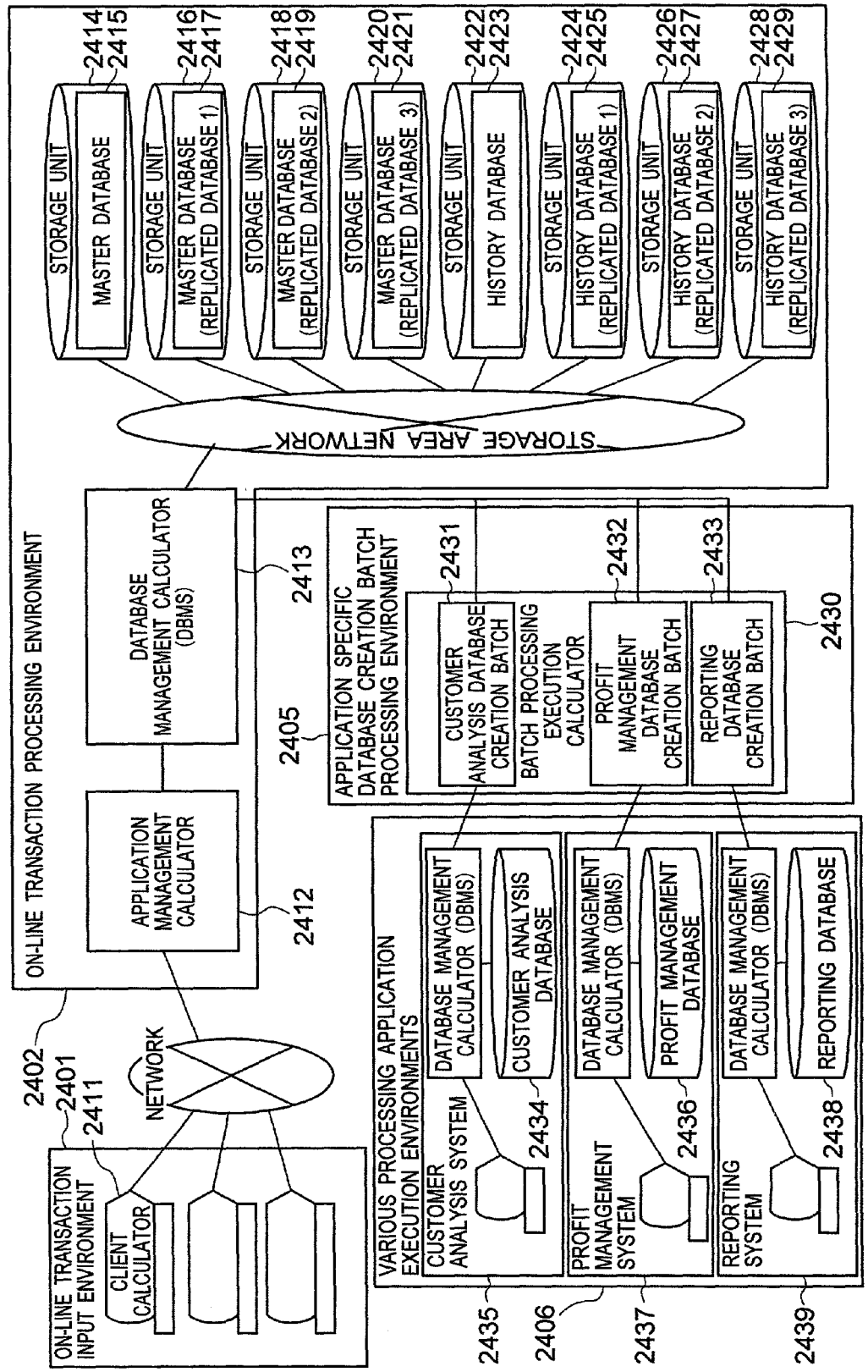
FIG. 22 is a block diagram of an overall system connecting an on-line transaction processing system and systems specific to processing applications such as analysis through data synchronizing unit, data directory information dynamic copying unit, access target allocating unit and access target setting unit.

FIG. 22 is a block diagram of an overall system connecting an on-line transaction processing system and systems specific to processing applications such as analysis through the data synchronizing unit, data directory information dynamic copying unit, access target allocating unit and access target setting unit. The system is constructed of an on-line transaction input environment 2401, an on-line transaction processing environment 2402, an application specific database creation batch processing environment 2405 and various processing application execution environments 2406. These environments have the following configurations.

The on-line transaction input environment 2401 is constructed of a plurality of client calculators 2411 that inputs on-line transactions. The on-line transaction processing environment 2402 is constructed of an application management calculator 2412 that accepts and executes an on-line transaction request, a database management calculator 2413 that manages on-line transaction data, storage units 2414, 2416, 2418 and 2420, which are a storage unit group connected via a network (e.g., Storage Area Network) such as a fiber channel and in which the database management calculator 2413 stores on-line transaction data, a master database 2415 assigned to a logical volume in the storage unit, replicated databases 2417, 2419 and 2421, storage units 2422, 2424, 2426 and 2428 in which the database management calculator 2413 stores on-line transaction history data, a history database 2423 assigned to a logical volume in the storage unit, and replicated databases 2425, 2427 and 2429.

Here, when an operation is performed for data in the master database 2415, the same operation is performed for the corresponding data in the replicated databases 2417, 2419 and 2421. Further, when an operation is performed for data in the history database 2423, the same operation is performed for the corresponding data in the replicated databases 2425, 2427 and 2429. The application specific database creation batch processing environment 2405 is constructed of a batch processing execution calculator 2430 for creating various application specific databases required in various processing application execution environments 2406 based on replicated data bases 2417, 2419, 2421, 2425, 2427 and 2429, a customer analysis database creation batch 2431, a profit management database creation batch 2432 and a reporting database creation batch 2433.

The various processing application execution environments 2406 are constructed of a customer analysis system 2435 using a customer analysis database 2434, a profit management system 2437 using a profit management database 2436, and a reporting system 2439 using a reporting database 2438. Various processing application specific databases 2434, 2436 and 2438 can also be a storage unit group connected via a network (e.g., Storage Area Network) such as a fiber channel.

Figure 23:
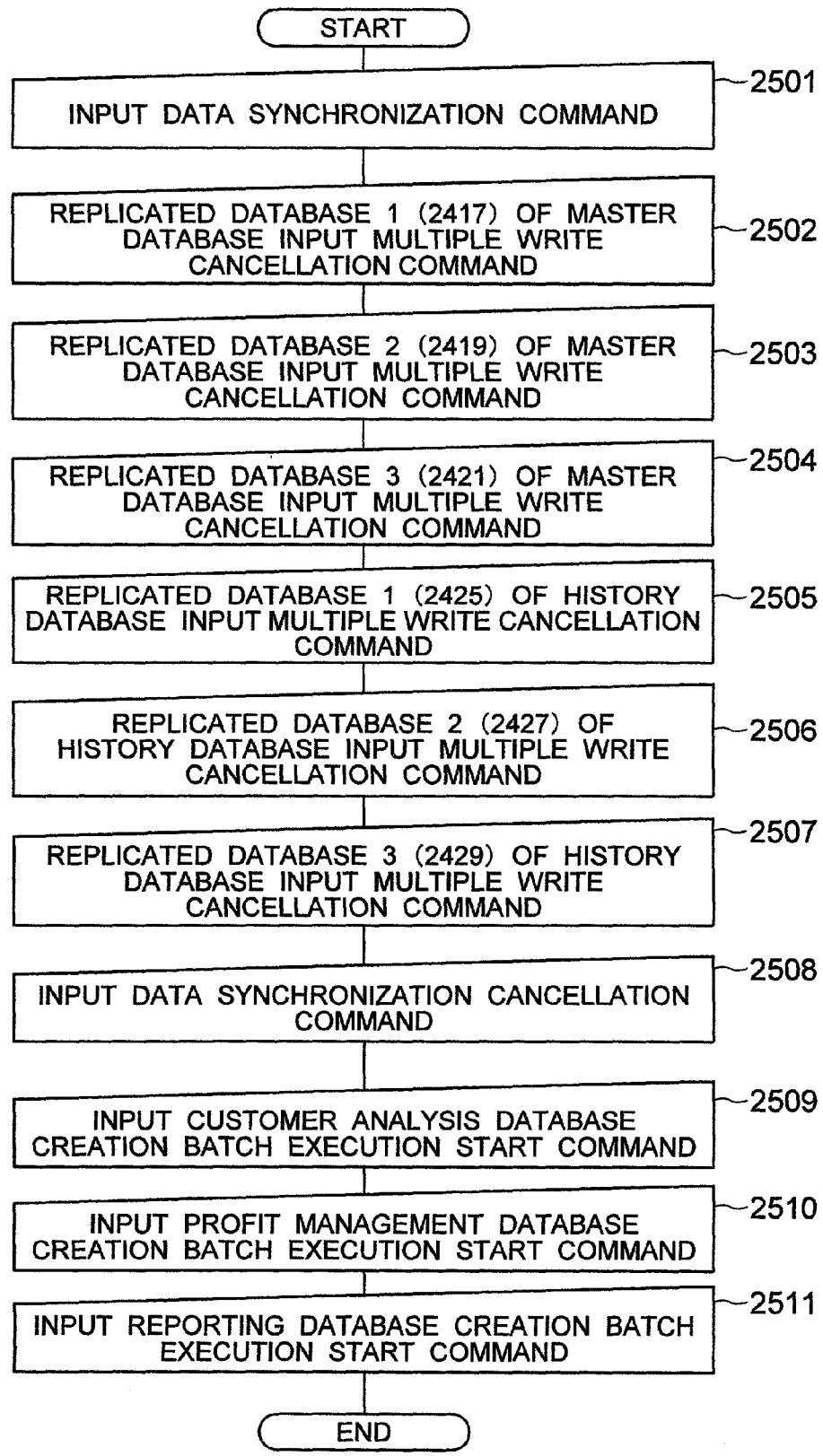
FIG. 23 is a flow chart of processing for creating replicated databases 2417, 2419 and 2421 of a master database and replicated databases 2425, 2427 and 2429 of a history database.

FIG. 23 is a flow chart of processing for creating replicated databases 2417, 2419 and 2421 of the master database and replicated databases 2425, 2427 and 2429 of the history database. The replicated databases 2417, 2419 and 2421 of the master database have the same contents as those of the master database 2415 from which data is multi-written. On the other hand, the replicated databases 2425, 2427 and 2429 of the history database have the same contents as those of the history database 2423 from which data is multi-written. First, the user inputs a data synchronization command to the database management calculator 2413 (step 2501). Then, the user inputs a multiple write cancellation command for the replicated databases 2417, 2419 and 2421 of the master database to the database management calculator 2413 (steps 2502, 2503 and 2504).

Then, the user inputs a multiple write cancellation command for the replicated databases 2425, 2427 and 2429 of the history database to the database management calculator 2413 (steps 2505, 2506 and 2507). This allows the replicated databases 2417, 2419 and 2421 of the master database and the replicated databases 2425, 2427 and 2429 of the history database to cancel multiple writing while assuring consistency. Then, the user inputs a data synchronization cancellation command to the database management calculator 2413 (step 2508). Finally, the user inputs commands to start execution of the customer analysis database creation batch 2431, profit management database creation batch 2432 and reporting database creation batch 2433 to the batch processing execution calculator 2430 (steps 2509, 2510 and 2511) to create various processing application databases 2434, 2436 and 2438.

This completes the explanations of the third embodiment, and in conclusion, the effects of this embodiment will be summarized below.

The operation system of this embodiment minimizes influences on on-line transaction processing applications and creates application specific databases, and therefore does not require CPU resources to create replicas of on-line transaction data and transaction history database nor requires memory to execute a program for data replication in FIG. 19. Even if business hours providing around-the-clock services using the Internet, etc. are extended and the amount of on-line transaction increases accordingly, this embodiment can execute DB synchronization and multiplexing cancellation from step 2501 to 2508 in FIG. 23 at any given time, and can thereby also execute the application specific database creation batches 2431, 2432 and 2433 in FIG. 22 at any given time. Furthermore, since this embodiment performs multiplexing using replicas of on-line transaction data and transaction history database, and can thereby secure independency by executing the application specific database creation batches 2431, 2127 and 2128, preventing contention and shortening batch execution time through parallel execution. Furthermore, in the case where the customer analysis database 2434 in the customer analysis system 2435 in FIG. 22 is a replica counting result of on-line transaction data, when a drill through, that is, accessing the master database that retains related detailed data based on the counting result, is performed, it is possible to secure consistency of the data by using replication of the master database at the time of counting.

As described above, the present invention can execute batch processing applications independently of and in parallel to an on-line processing application by using replicated databases crated by physically copying logical volumes storing databases. Especially in a SAN environment, the present invention can minimize influences on on-line processing applications by making the most of additional functions such as a high-speed copy function on the storage unit side.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A data processing unit including a database management system operating on an external storage unit provided with multiple storage areas for storing data, a multiple write mechanism allowing multiple writes of same data, a multiple write cancellation mechanism separating multi-written areas at a desired time to allow independent reading and writing as different control areas, and a physical copy mechanism that allows copying of data stored in the multiple storage areas, the data processing unit comprising:

a first data synchronizing system for writing in a data cache, and then to the multiple storage areas in the external storage unit, unwritten data, and for delaying writing updated data to the multiple storage areas;

a first data synchronization canceling system for restarting an update of the data under control of the first data synchronizing system;

a second data synchronizing system for erasing all data in the data cache when all transactions in progress are completed, and for temporarily prohibiting access by a newly generated transaction while the erasing is occurring; and a second data synchronization canceling system for restarting data access under control of the second synchronizing system.

2. A system as in claim 1 wherein the first data synchronizing controller provides a plurality of functions including:

a first function which allows updating of the transactions through the data cache in response to a data access request from a transaction;

a second function which allows updating of the transactions then in progress, but prohibits updating the newly generated transaction;

a third function which allows referencing of all transactions and updating of the transaction in progress, but prohibits updating the newly generated transaction;

a fourth function which allows referencing all transactions, and allows updating all transactions, but only in the data cache;

a fifth function which allows updating the transaction in progress, and prohibits updating a newly generated transaction; and a sixth function which allows updating the transaction in progress, and delays updating the newly generated transaction.

3. A data processing unit including a database management system operating on an external storage unit provided with multiple storage areas for storing data, a multiple write mechanism allowing multiple writes of same data, a multiple write cancellation mechanism separating multi-written areas at a desired time to allow independent reading and writing as different control areas, and a physical copy mechanism that allows copying of data stored in the multiple storage areas, and including a first data synchronizing system for writing in a data cache, and then to the multiple storage areas in the external storage unit, unwritten data, and for delaying writing updated data to the multiple storage areas, and a first data synchronization canceling system for restarting an update of the data under control of the first data synchronizing system, the first data synchronizing system including:

a first function which allows updating of the transactions through the data cache in response to a data access request from a transaction;

a second function which allows updating of the transactions then in progress, but prohibits updating the newly generated transaction;

a third function which allows referencing of all transactions and updating of the transaction in progress, but prohibits updating the newly generated transaction;

a fourth function which allows referencing all transactions, and allows updating all transactions, but only in the data cache;

a fifth function which allows updating the transaction in progress, and prohibits updating a newly generated transaction; and a sixth function which allows updating the transaction in progress, and delays updating the newly generated transaction.

4. A system as in claim 3 wherein the first data synchronizing controller further comprises:

a first transition for changing from the first function to one of the second and the third function;

a second transition whereby upon completion of all transactions in progress in one of the second and third functions, all data in the data cache not already written to the multiple storage areas for storing data are written, and the function is changed to one of the fourth and first functions;

a third transition for changing from the fourth function to the first function; and a fourth transition for changing from the first function to one of the fifth and the sixth functions.

5. A system as in claim 4 wherein the second data synchronizing controller further comprises a fifth transition whereby upon completion of all transactions in progress in one of the fifth and the sixth functions, all data in the data cache are erased from the data cache, and the function is changed to the first function.

6. A data processing unit wherein in a database management system operating on data in an external storage unit having multiple storage areas for storing data, having a multiple write mechanism allowing multiple write of same data, and having a multiple write cancellation mechanism that separates multi-written areas at a specified time to allow independent reading and writing as different control areas, and having a physical copy mechanism that allows copying of data stored in respective areas, the data processing unit comprising:

a data directory information dynamic copying subsystem for copying, based on data directory information registered in the database management system, common information independent of an access path of the storage area, and rewriting the common information only of the access path to the storage area to another storage area, and for dynamically adding second data directory information which includes a new name of first data directory information of a source of the common information;

a data directory information dynamic registering subsystem capable of registering the second data directory information in the database management system; and an access target allocating subsystem for changing a database access request from an application program to be executed according to the first data directory information to cause the database access request to be executed according to the second data directory information.

7. The data processing unit of claim 6 wherein:

the data directory information dynamic copying subsystem adds an arbitrary generation identifier to the second data directory information;

the access target allocating subsystem selects at least one data directory information group by at least one of a generation identifier and a name of the second data directory information to allocate an access target databases;

the access target setting subsystem specifies at least one of the generation identifier and a name of a newly added data directory information in relation to clients accessing the database; and the data processing unit further including a current access generation setting subsystem for determining access requests from a client for which neither a generation identifier nor a name of the data directory information is provided.

* * * * *